United States Patent
Takada et al.

(10) Patent No.: US 12,360,834 B2
(45) Date of Patent: Jul. 15, 2025

(54) MEMORY SYSTEM AND METHOD

(71) Applicant: Kioxia Corporation, Tokyo (JP)

(72) Inventors: Marie Takada, Yokohama Kanagawa (JP); Masanobu Shirakawa, Chigasaki Kanagawa (JP); Naomi Takeda, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 50 days.

(21) Appl. No.: 18/450,239

(22) Filed: Aug. 15, 2023

(65) Prior Publication Data

US 2024/0095112 A1 Mar. 21, 2024

(30) Foreign Application Priority Data

Sep. 20, 2022 (JP) .................. 2022-148952

(51) Int. Cl.
*G06F 11/00* (2006.01)
*G06F 11/07* (2006.01)
*G06F 12/02* (2006.01)

(52) U.S. Cl.
CPC ........ *G06F 11/073* (2013.01); *G06F 12/0246* (2013.01)

(58) Field of Classification Search
CPC ............ G06F 11/073; G06F 12/0246
See application file for complete search history.

(56) References Cited

U.S. PATENT DOCUMENTS

| | | | |
|---|---|---|---|
| 9,996,281 B2 | 6/2018 | Sharon et al. | |
| 10,339,983 B1* | 7/2019 | Confalonieri | G11C 13/0033 |
| 10,535,383 B2 | 1/2020 | Thalaimalaivanaraj et al. | |
| 2017/0053714 A1* | 2/2017 | Guy | G11C 11/40626 |
| 2019/0066792 A1* | 2/2019 | Muchherla | G06F 12/0246 |
| 2020/0394114 A1* | 12/2020 | Lee | G06F 3/0614 |
| 2022/0065702 A1 | 3/2022 | Terada et al. | |

FOREIGN PATENT DOCUMENTS

JP 2022-038392 A 3/2022

* cited by examiner

*Primary Examiner* — Jason B Bryan
(74) *Attorney, Agent, or Firm* — Foley & Lardner LLP

(57) ABSTRACT

According to an embodiment, a controller acquires a first temperature detection value and executes an acquisition operation on a first storage area. The controller converts a first voltage value into a second voltage value representing the read voltage in a temperature set value based on the first temperature detection value and records the second voltage value. The acquisition operation is an operation of determining, by using the read voltages, whether memory cells are ON or OFF and acquiring the first voltage value representing the read voltage for suppressing error bits. After that, the controller acquires a second temperature detection value and converts the second voltage value into a third voltage value representing the read voltage in the second temperature detection value. The controller reads data from the memory cells by using, as the read voltage, a voltage indicated by the third voltage value.

18 Claims, 25 Drawing Sheets

FIG.7

| SEC-TION | (1) | (2) | (3) | (4) | (5) | (6) | (7) | (8) | (9) | (10) | (11) | (12) |
|---|---|---|---|---|---|---|---|---|---|---|---|---|
| CR | 0 | 0 | 0 | 0 | 0 | 0 | 1 | 1 | 1 | 1 | 1 | 1 |
| SFT1 | 1 | 0 | 0 | 0 | 0 | 0 | 0 | 1 | 1 | 1 | 1 | 1 |
| SFT2 | 1 | 1 | 0 | 0 | 0 | 0 | 0 | 0 | 1 | 1 | 1 | 1 |
| SFT3 | 1 | 1 | 1 | 0 | 0 | 0 | 0 | 0 | 0 | 1 | 1 | 1 |
| SFT4 | 1 | 1 | 1 | 1 | 0 | 0 | 0 | 0 | 0 | 0 | 1 | 1 |
| SFT5 | 1 | 1 | 1 | 1 | 1 | 0 | 0 | 0 | 0 | 0 | 0 | 1 |

FIG.11
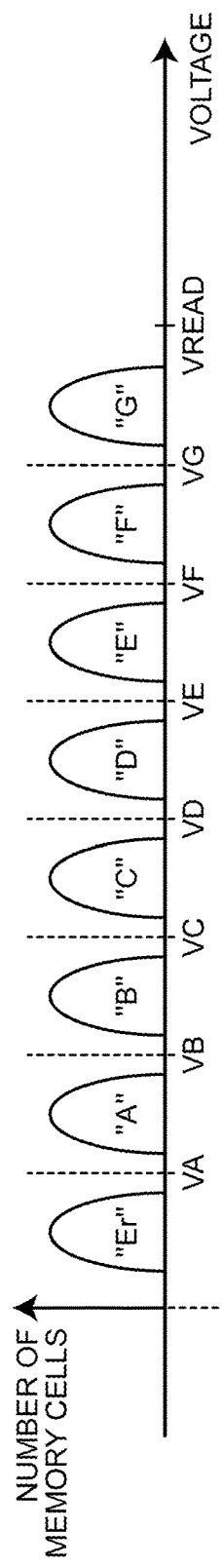
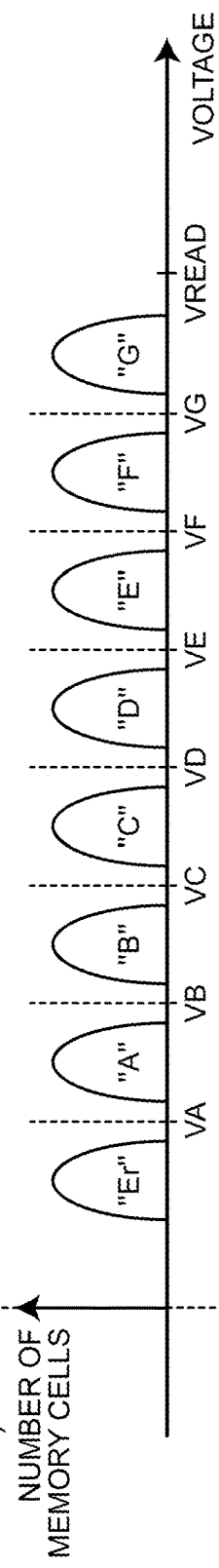
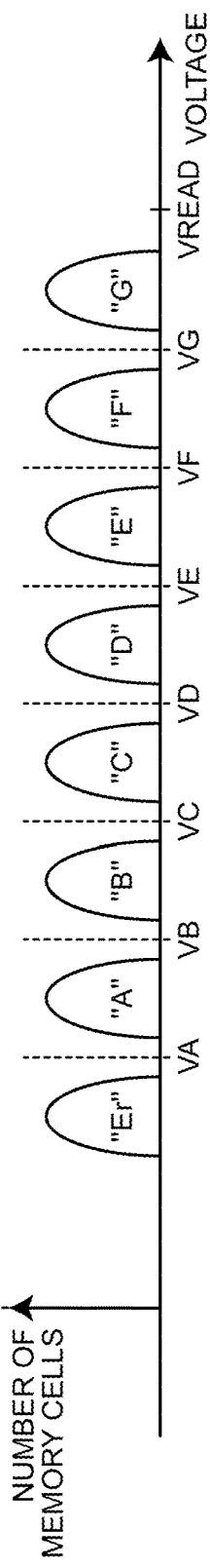

TEMPERATURE
INQUIRY COMMAND

ADDRESS INFORMATION
(MEMORY CHIP ADDRESS)

TEMPERATURE
DETECTION VALUE

| | REFERENCE READ VOLTAGE (VA, VB, VC, VD, VE, VF, VG) 211 |
|---|---|
| BLOCK #0 | |
| BLOCK #1 | |
| BLOCK #2 | |
| ⋮ | |

FIG.25

| INDEX | SHIFT PATTERN (VA, VB, VC, VD, VE, VF, VG) |
|---|---|
| 0 | |
| 1 | |
| 2 | |
| 3 | |
| 4 | |
| ⋮ | |

| | INITIAL SETTING VALUE (VA, VB, VC, VD, VE, VF, VG) |
|---|---|
| BLOCK GROUP #0 | |
| BLOCK GROUP #1 | |
| BLOCK GROUP #2 | |
| ⋮ | |

```
START
  ↓
S1001: PROGRAM OPERATION FOR REPRESENTATIVE BLOCK IS COMPLETED
  ↓
S1002: PREDETERMINED SHORT TIME (FOR EXAMPLE, 6 HOURS) ELAPSES
  ↓
S1003: PERFORM VARIOUS PROCESSES INCLUDING OPTIMUM VALUE ACQUISITION OPERATION, AND ACQUIRE SET OF REFERENCE READ VOLTAGES RELATED TO REPRESENTATIVE BLOCK
  ↓
S1004: OVERWRITE AND RECORD OBTAINED SET OF REFERENCE READ VOLTAGES IN INITIAL SETTING VALUE TABLE AS SET OF INITIAL SETTING VALUES RELATED TO BLOCK GROUP TO WHICH REPRESENTATIVE BLOCK BELONGS
  ↓
END
```

MEMORY SYSTEM AND METHOD

CROSS-REFERENCE TO RELATED APPLICATION

This application is based upon and claims the benefit of priority from Japanese Patent Application No. 2022-148952, filed on Sep. 20, 2022; the entire contents of which are incorporated herein by reference.

FIELD

Embodiments described herein relate generally to a memory system and a method.

BACKGROUND

Conventionally, a memory system including a memory cell transistor is widely known. In a read operation executed by such a memory system, data held in the memory cell transistor is determined on the basis of comparison between a threshold voltage of the memory cell transistor and a read voltage.

The threshold voltage of the memory cell transistor can change with various factors. Therefore, the memory system is configured to be able to change a value of the read voltage. In a case where erroneous determination of data occurs in the read operation, the memory system can execute shift reading in which the value of the read voltage is changed and the read operation is performed.

BRIEF DESCRIPTION OF THE DRAWINGS

FIG. 7 is a diagram illustrating data of a determination result obtained by each shift reading executed in the first optimum value acquisition operation of the embodiment and data of a determination result obtained by mask data reading for each section;

FIG. 11 is a diagram illustrating an example of temperature dependency of a read voltage in a certain memory chip according to the embodiment;

FIG. 25 is a diagram illustrating an example of a data structure of a shift index table according to the second modification;

FIG. 28 is a diagram illustrating an example of a management method of a third modification of a set of initial setting values; and FIG. 29 is a flowchart illustrating an example of an update method of the third modification of the set of initial setting values.

DETAILED DESCRIPTION

According to the present embodiment, a memory system includes a non-volatile first memory, a second memory, a third memory, a temperature sensor, and a controller. The non-volatile first memory includes a first storage area. The first area includes a word line and a plurality of memory cells connected to the word line. The second memory stores first information corresponding to temperature dependency of threshold voltages of the plurality of memory cells. The third memory stores second information in which values of read voltages corresponding to threshold voltages of the plurality of memory cells are recorded. At a first timing, the controller acquires a first temperature detection value from the temperature sensor and executes an acquisition operation on the first storage area. The acquisition operation is an operation of determining, by using the read voltages, whether the plurality of memory cells are in an on state or an off state and acquiring, on the basis of a determination result, a first voltage value being a value of the read voltage for suppressing an occurrence number of error bits. The controller converts the first voltage value into a second voltage value being a value of the read voltage in a temperature set value on the basis of the first temperature detection value and the first information, and records the second voltage value in the second information. At a second timing after the first timing, the controller acquires a second temperature detection value from the temperature sensor. The controller converts the second voltage value recorded in the second information into a third voltage value being a value of the read voltage in the second temperature detection value. The second voltage value is converted on the basis of the second temperature detection value and the first information. The controller executes a first read operation of acquiring data from the plurality of memory cells by using, as the read voltage, a voltage indicated by the third voltage value.

Hereinafter, a memory system and a method according to embodiments will be described in detail with reference to the accompanying drawings. Note that the present invention is not limited by this embodiment.

Embodiment

Figure 1:
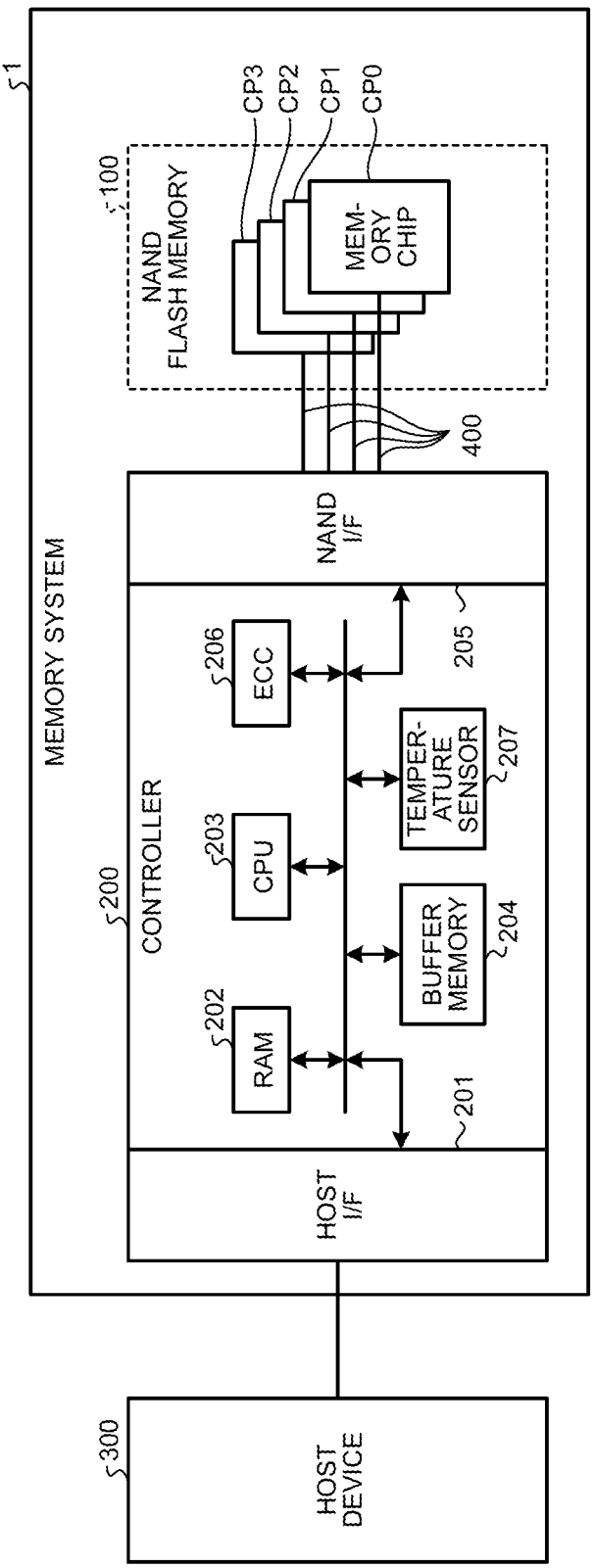
FIG. 1 is a diagram illustrating a configuration example of a memory system according to an embodiment.

FIG. 1 is a diagram illustrating a configuration example of a memory system according to an embodiment. As illustrated in FIG. 1, a memory system 1 can be connected to a host device 300. The host device 300 corresponds to, for example, a server, a personal computer, a mobile information processing device, or the like. The memory system 1 functions as an external storage device of the host device 300. The host device 300 can issue a command to the memory system 1. The command for the memory system 1 includes a read command and a write command.

The memory system 1 includes one or more memory chips CP as a NAND flash memory 100, and one controller 200. Here, the memory system 1 includes memory chips CP0, CP1, CP2, and CP3 as the one or more memory chips CP. Note that the number of memory chips CP included in the memory system 1 is not limited to four.

Note that the NAND flash memory 100 is an example of a non-volatile first memory.

Each of the memory chips CP includes a plurality of memory cell transistors, and can store data in a non-volatile manner. The memory chip CP is connected to the controller 200 by a NAND bus 400.

The controller 200 includes a host interface circuit (HOST I/F) 201, a random access memory (RAM) 202, a central processing unit (CPU) 203, a buffer memory 204, a NAND interface circuit (NAND I/F) 205, an error correction code (ECC) circuit 206, and a temperature sensor 207.

The controller 200 can be configured as, for example, a system-on-a-chip (SoC). The controller 200 may include a plurality of chips. The controller 200 may include a field-programmable gate array (FPGA) or an application specific integrated circuit (ASIC) instead of the CPU 203. That is, the controller 200 may be configured by software, hardware, or a combination thereof. Note that the RAM 202 may be disposed outside the controller 200. Moreover, the temperature sensor 207 may be disposed outside the controller 200.

The host interface circuit 201 is connected to the host device 300 via a bus conforming to, for example, the serial advanced technology attachment (SATA) standard, the serial attached SCSI (SAS) standard, or the peripheral components interconnect (PCI) Express (trademark), and manages communication between the controller 200 and the host device 300.

The NAND interface circuit 205 is connected to each of the memory chips CP via the NAND bus 400, and manages communication between the controller 200 and the memory chip CP.

The CPU 203 controls an operation of the controller 200.

The RAM 202 is used as a work area of the CPU 203. The buffer memory 204 temporarily holds data transmitted to the memory chip CP and data received from the memory chip CP. The RAM 202 and the buffer memory 204 can be configured by, for example, a dynamic random access memory (DRAM), a static random access memory (SRAM), or a combination thereof. Note that the types of memories constituting the RAM 202 and the buffer memory 204 are not limited thereto.

The ECC circuit 206 detects an error and corrects the detected error by using an error correction code. Detection of the error and correction of the detected error are simply referred to as error correction.

The temperature sensor 207 detects a temperature of the memory system 1. The CPU 203 uses a temperature detection value by the temperature sensor 207 for various controls of the memory system 1.

Figure 2:
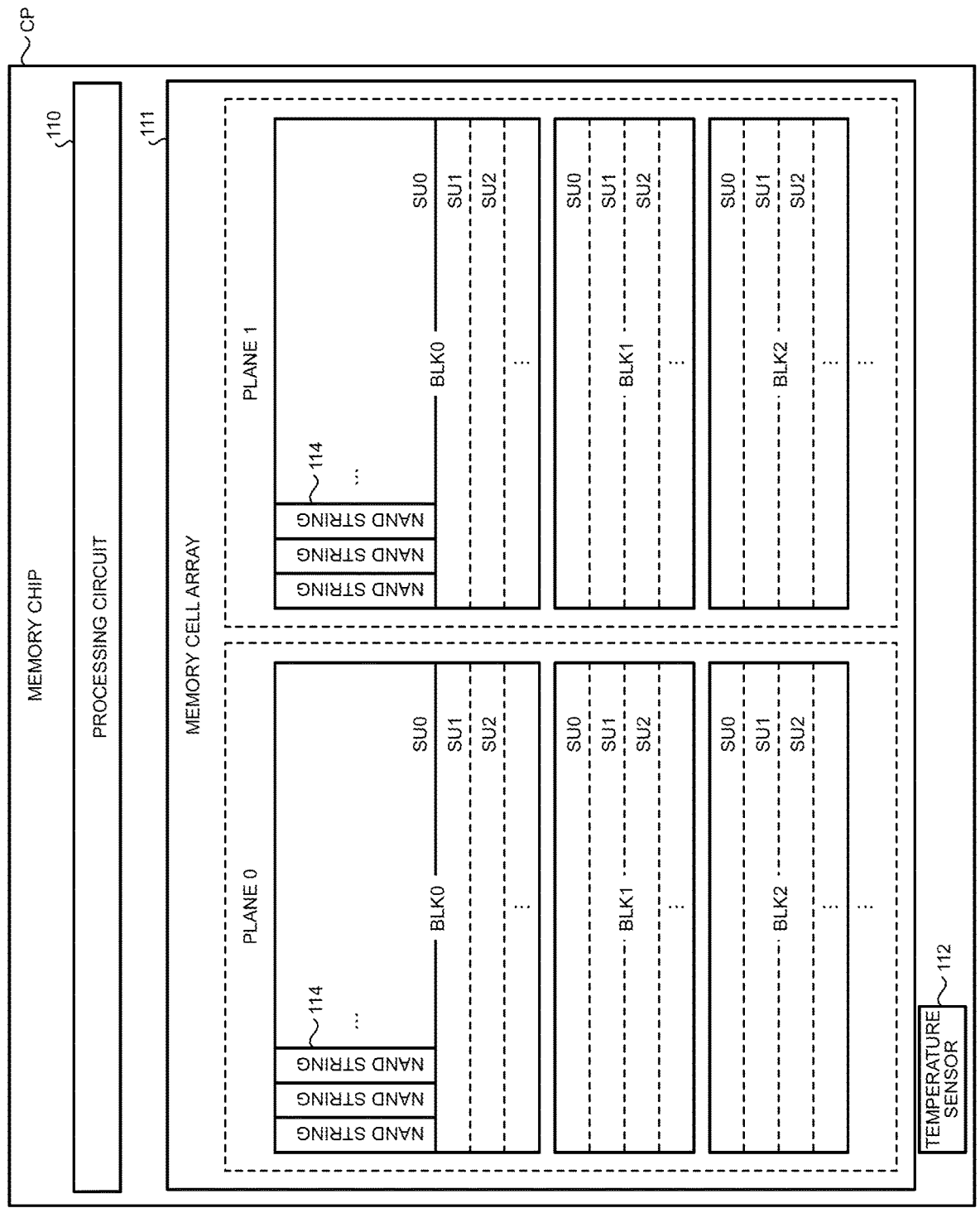
FIG. 2 is a diagram illustrating a configuration example of a memory chip according to an embodiment.

FIG. 2 is a diagram illustrating a configuration example of the memory chip CP according to the embodiment. As illustrated, the memory chip CP includes processing circuit 110, a memory cell array 111, and a temperature sensor 112.

The memory cell array 111 is divided into a plurality of planes (PLANE 0, PLANE 1). Each of the planes is a sub-array that can be accessed in parallel. Each of the planes includes a plurality of blocks BLK (BLK0, BLK1, ... ), each of which is a set of non-volatile memory cell transistors. Each of the blocks BLK includes a plurality of string units SU (SU0, SU1, ... ), each of which is a set of memory cell transistors associated with a word line and a bit line. Each of the string units SU includes a plurality of NAND strings 114 in which memory cell transistors are connected in series. Note that the number of NAND strings 114 in the string unit SU is optional. Note that the number of planes included in the memory cell array 111 is not limited to two. Moreover, the memory cell array 111 is not necessarily divided.

The processing circuit 110 includes, for example, a row decoder, a column decoder, a sense amplifier, a latch circuit, and a voltage generation circuit. The processing circuit 110 executes a program operation, a sense operation, and an erase operation on the memory cell array 111 of each plane in accordance with a command from the controller 200.

The program operation is an operation of writing data in the memory cell array 111. The sense operation is an operation of reading data from the memory cell array 111.

Note that a series of operations in which the controller 200 writes data to the memory chip CP is referred to as a write operation. The write operation includes a data-in operation in which the controller 200 transfers data to the memory chip CP and a program operation in which the processing circuit 110 writes data received by the data-in operation to the memory cell array 111.

A series of operations in which the controller 200 reads data from the memory chip CP is referred to as a read operation. The read operation includes a sense operation in which the processing circuit 110 reads data from the memory cell array 111 and a data-out operation in which the controller 200 acquires data read by the sense operation from the memory chip CP.

The temperature sensor 112 detects a temperature of the memory chip CP. When executing the read operation, the controller 200 acquires a temperature detection value by the temperature sensor 112 from the memory chip CP, and uses the acquired temperature detection value for control of the memory chip CP.

Figure 3:
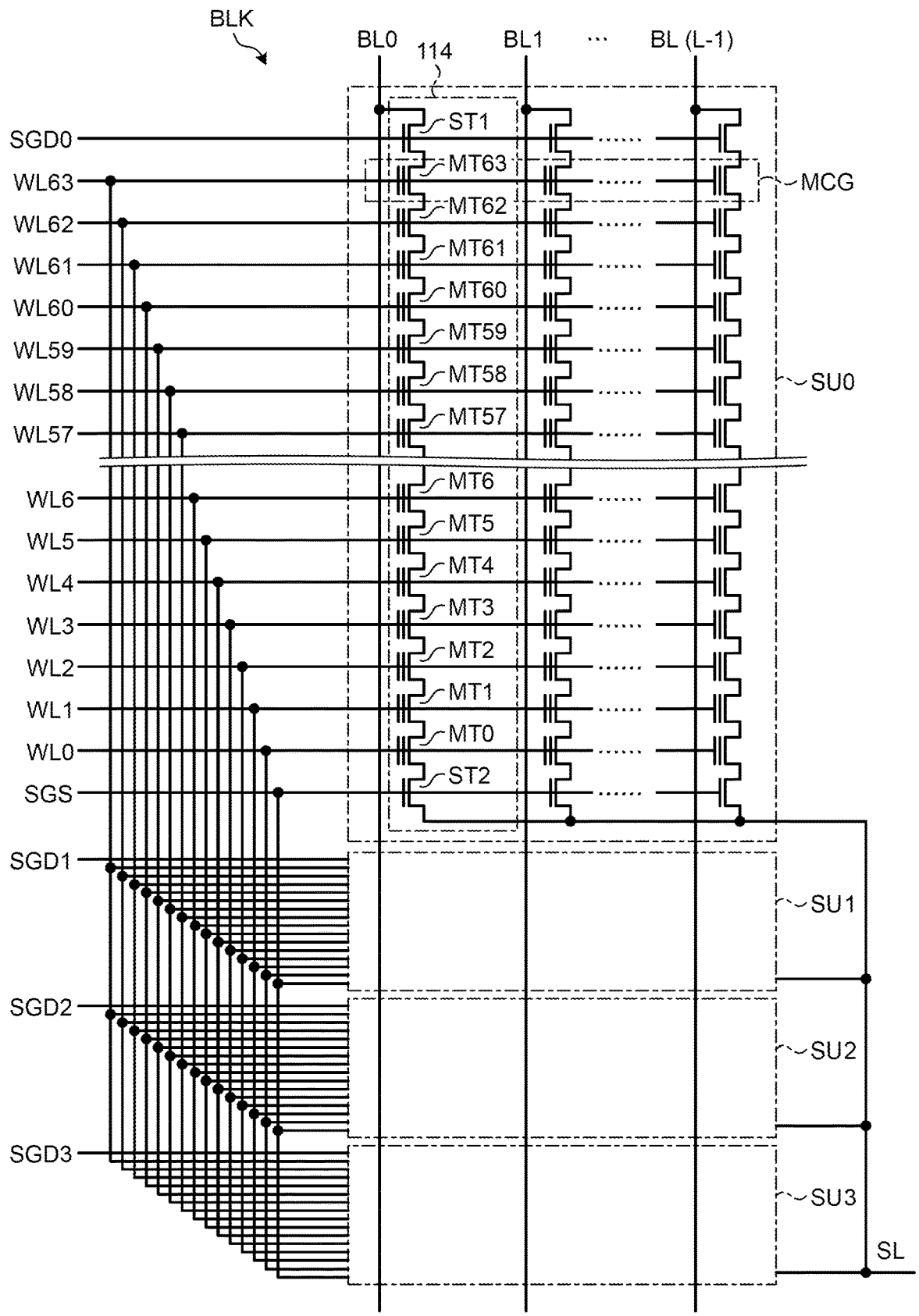
FIG. 3 is a diagram illustrating a circuit configuration of a block according to the embodiment.

FIG. 3 is a diagram illustrating a circuit configuration of the block BLK of the embodiment. Note that each of the blocks BLK have the same configuration. The block BLK includes, for example, four string units SU0 to SU3. Each of the string units SU includes a plurality of NAND strings 114.

Each of the NAND strings 114 includes, for example, sixty-four (64) memory cell transistors MT (MT0 to MT63) and select transistors ST1 and ST2. Each of the memory cell transistors MT includes a control gate and a charge storage layer, and holds data in a non-volatile manner. The sixty-four memory cell transistors MT (MT0 to MT63) are connected in series between the source of the select transistor ST1 and the drain of the select transistor ST2. Note that each of the memory cell transistors MT may be a MONOS type with an insulating film for the charge storage layer, or may be an FG type with a conductive film for the charge storage layer. Moreover, the number of memory cell transistors MT in the NAND string 114 is not limited to sixty-four.

Gates of the select transistors ST1 in the string units SU0 to SU3 are connected to select gate lines SGD0 to SGD3, respectively. On the other hand, gates of the select transistors ST2 in the string units SU0 to SU3 are commonly connected to, for example, a select gate line SGS. The gates of the select transistors ST2 in the string units SU0 to SU3 may be connected to select gate lines SGS0 to SGS4 different for each string unit SU. Control gates of the memory cell transistors MT0 to MT63 in the same block BLK are commonly connected to the word lines WL0 to WL63, respectively.

The drains of the select transistors ST1 of the NAND strings 114 in the string unit SU are connected to different bit lines BL (BL0 to BL(L−1), where L is a natural number of 2 or more). Moreover, the bit line BL commonly connects one NAND string 114 in each string unit SU among the plurality of blocks BLK. Moreover, the source of each select transistor ST2 is commonly connected to the source line SL.

That is, the string unit SU is a set of NAND strings 114 connected to different bit lines BL and connected to the same select gate line SGD. Moreover, the block BLK is a set of the plurality of string units SU sharing the word line WL. The memory cell array 111 is a set of the plurality of blocks BLK sharing the bit line BL.

The program operation and the sense operation on one plane by the processing circuit 110 are collectively performed on the memory cell transistors MT connected to one word line WL in one string unit SU. Hereinafter, a group of the memory cell transistors MT selected collectively in the program operation and the sense operation on one plane is referred to as a "memory cell group MCG". A storage area of a collection of 1-bit data to be written or read in one memory cell group MCG is referred to as a "page".

The erase operation on one plane by the processing circuit 110 can be performed in units of block BLK or units smaller than the block BLK.

Note that one logical page is configured by a plurality of pages stored in different planes or different memory chips CP, and the controller 200 may instruct the program operation or the sense operation in parallel for the plurality of pages configuring one logical page. Moreover, one logical block may be constituted by a plurality of the blocks BLK provided in different planes or different memory chips CP, and the controller 200 may instruct the erase operation to the plurality of blocks BLK constituting one logical block in parallel.

Hereinafter, the memory cell transistor MT is simply referred to as a memory cell.

Data of n (n≥1) bits can be written to each memory cell. In a case where n-bit data is written to each memory cell, a storage capacity per memory cell group MCG is equal to a size of n pages. A mode in which n is 1 is referred to as a single level cell (SLC) mode. A mode in which n is 2 is referred to as a multi-level cell (MLC) mode. A mode in which n is 3 is referred to as a triple level cell (TLC) mode. A mode in which n is 4 is referred to as a quad level cell (QLC) mode.

A threshold voltage of each memory cell is controlled within a certain range by the processing circuit 110. A controllable range of the threshold voltage is divided into n-th power of 2 sections, and n-bit values different from each other are assigned to each section.

In the embodiment and the following embodiments, an example in which a memory cell is used in the TLC mode will be described. Note that the embodiment and the following embodiments are applicable not only to a system in which a memory cell is used in the TLC mode but also to a system in which a memory cell is used in an optional mode.

Figure 4:
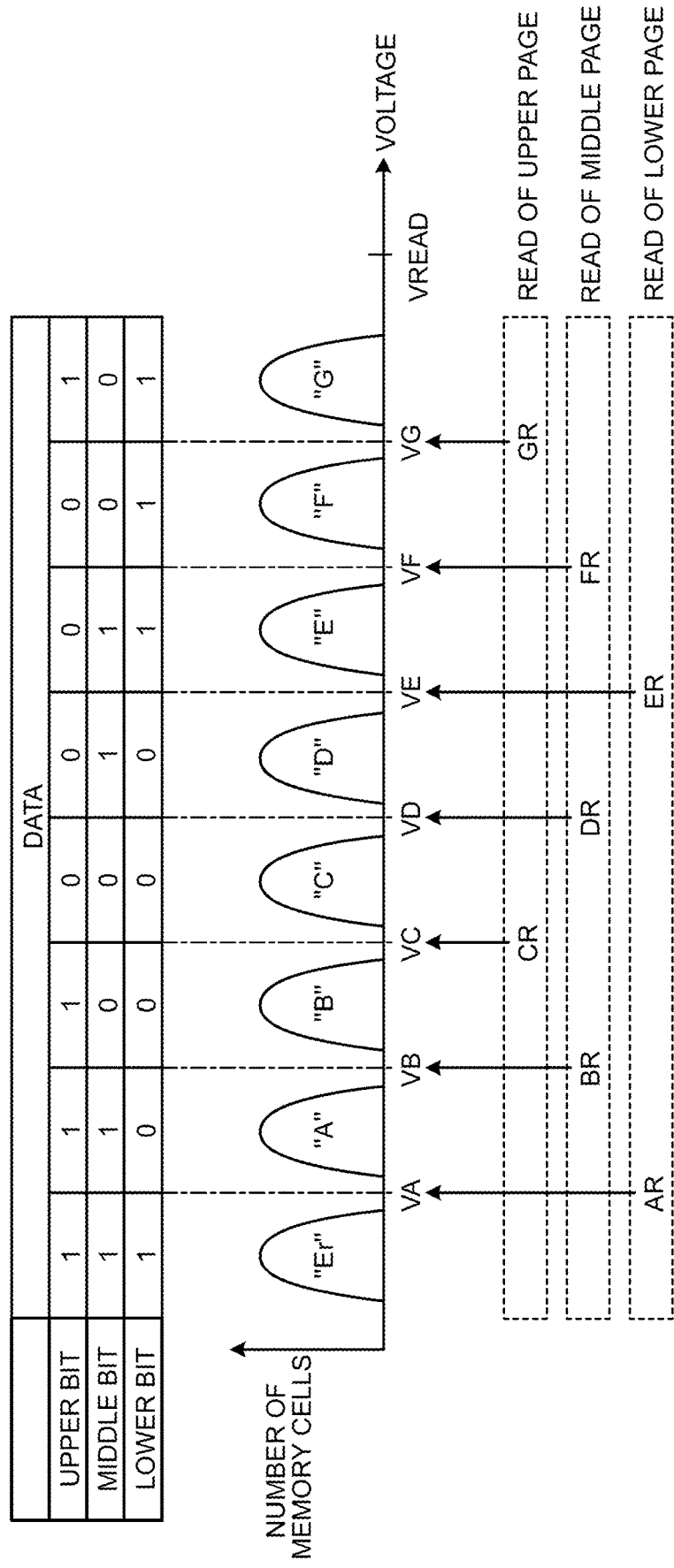
FIG. 4 is a diagram for explaining an example of data coding according to the embodiment.

FIG. 4 is a diagram for explaining an example of data coding according to the embodiment.

As described above, according to the TLC mode, 3-bit data is stored per memory cell. Each bit constituting the 3-bit data stored in the memory cell is expressed as an upper bit, a middle bit, and a lower bit in accordance with the arrangement order. Out of the three pages included in the memory cell group MSG, a page in which a group of upper bits is stored is referred to as an upper page, a page in which a group of middle bits is stored is referred to as a middle page, and a page in which a group of lower bits is stored is referred to as a lower page.

According to the TLC mode, a possible range of the threshold voltage is divided into eight ranges. These eight ranges are referred to as an "Er" state, an "A" state, a "B" state, a "C" state, a "D" state, an "E" state, an "F" state, and a "G" state in order from a lower threshold voltage. The threshold voltage of each memory cell is controlled by the processing circuit 110 to belong to any of the "Er" state, the "A" state, the "B" state, the "C" state, the "D" state, the "E" state, the "F" state, and the "G" state. As a result, in a case where the number of memory cells with respect to the threshold voltage is plotted, the memory cells ideally form eight lobe-like distributions that do not overlap with one another and belong to different states as illustrated in the middle part of FIG. 4. Hereinafter, the distribution for each state may be simply referred to as a lobe.

The eight states correspond to 3-bit data. The upper table in FIG. 4 illustrates an example of a correspondence between a state and 3-bit data, that is, data coding. According to this example, the "Er" state corresponds to "111", the "A" state corresponds to "110", the "B" state corresponds to "100", the "C" state corresponds to "000", the "D" state corresponds to "010", the "E" state corresponds to "011", the "F" state corresponds to "001", and the "G" state corresponds to "101". Note that in a case where 3-bit data is described as "abc", "a" is an upper bit, "b" is a middle bit, and "c" is a lower bit. In this manner, each memory cell can hold data corresponding to the state to which the threshold voltage belongs. Note that the correspondence between states and data illustrated in FIG. 4 is an example of data coding. The data coding is not limited to the example in the drawing.

The threshold voltage is lowered to the "Er" state by the erase operation. Moreover, the threshold voltage is maintained in the "Er" state or raised by a program operation until reaching any of the "A" state, the "B" state, the "C" state, the "D" state, the "E" state, the "F" state, and the "G" state.

Specifically, in the program operation, the processing circuit 110 selects the bit line BL corresponding to a column address. The processing circuit 110 sets a potential of the selected bit line BL to 0. The processing circuit 110 selects the word line WL corresponding to a row address and applies a program pulse to the selected word line WL. Then, electrons are injected into the charge storage layer of the memory cell located at an intersection with the selected bit line BL and the selected word line WL, and as a result, the threshold voltage of the memory cell increases. The processing circuit 110 reads data at a predetermined timing to check whether or not the threshold voltage of the memory cell has reached a target state corresponding to the data of the write data (verify read). The processing circuit 110 continues to apply the program pulse until the threshold voltage of the memory cell reaches the target state.

Hereinafter, a memory cell in which a threshold voltage is set to a certain state by the program operation may be referred to as a memory cell belonging to the state.

A read voltage for determining data is set between two adjacent states. For example, as illustrated in FIG. 4, a read voltage VA is set between the "Er" state and the "A" state, a read voltage VB is set between the "A" state and the "B" state, a read voltage VC is set between the "B" state and the "C" state, a read voltage VD is set between the "C" state and the "D" state, a read voltage VE is set between the "D" state and the "E" state, a read voltage VF is set between the "E" state and the "F" state, and a read voltage VG is set between the "F" state and the "G" state.

In the sense operation, the processing circuit 110 sequentially applies a plurality of types of read voltages to the selected word line WL. The processing circuit 110 then determines, for each memory cell, whether the memory cell is in a conduction state (in other words, an on state) or a non-conduction state (in other words, an off state) when each read voltage is applied. The processing circuit 110 determines data associated with the state to which the memory cell belongs by a logical operation using a determination result that is obtained every time when the read voltage is applied.

Hereinafter, the operation of applying a single type of read voltage VX (X is any one of A to G) to the selected word line WL to determine whether the memory cell is in the on state or the off state for each memory cell will be referred to as X reading or XR for further omission in some drawings. Moreover, the determination result obtained by the X reading is referred to as a determination result XR.

In a case where the data coding illustrated in FIG. 4 is adopted, when a memory cell belongs to any of the "Er" state, the "E" state, the "F" state, and the "G" state, a lower bit of data held by the memory cell is "1". When a memory cell belongs to any of the "A" state, the "B" state, the "C" state, and the "D" state, a lower bit of data held by the memory cell is "0". Therefore, the processing circuit 110 determines the data of the upper page by using two types of read voltages VA and VE. Specifically, the processing circuit 110 performs the A reading and the E reading, and acquires the data of the lower page by a logical operation using the determination result AR obtained by the A reading and the determination result ER obtained by the E reading.

In a case where a memory cell belongs to any of the "Er" state, the "A" state, the "D" state, and the "E" state, a middle bit of data held by the memory cell is "1". In a case where a memory cell belongs to any of the "B" state, the "C" state, the "F" state, and the "G" state, a middle bit of data held by the memory cell is "0". Therefore, the processing circuit 110 determines the data of the middle page by using three types of read voltages of VB, VD, and VF. Specifically, the processing circuit 110 performs the B reading, the D reading, and the F reading. Then, the processing circuit 110 acquires the data of the middle page by a logical operation using the determination result BR obtained by the B reading, the determination result DR obtained by the D reading, and the determination result FR obtained by the F reading.

In a case where a memory cell belongs to any of the "Er" state, the "A" state, the "B" state, and the "G" state, an upper bit of data held by the memory cell is "1". In a case where a memory cell belongs to any of the "C" state, the "D" state, the "E" state, and the "F" state, an upper bit of data held by the memory cell is "0". Therefore, the processing circuit 110 determines the data of the upper page by using two types of read voltages of VC and VG. Specifically, the processing circuit 110 performs the C reading and the G reading, and acquires the data of the upper page by a logical operation using the determination result CR obtained by the C reading and the determination result GR obtained by the G reading.

As described above, the type of the read voltage used to determine the data varies with the type of page to be read. The processing circuit 110 acquires data of the page to be read by combining determination results as to whether the threshold voltage of the memory cell is higher or lower than the read voltage using each of the types of read voltages corresponding to the type of the page to be subjected to the sense operation alone.

In FIG. 4, the case where the memory cells form eight lobes that do not overlap with one another has been described. However, the threshold voltage of the memory cell may change with various factors. For example, the threshold voltage of the memory cell tends to change with the elapsed time from the completion of the program operation. The speed of change in the threshold voltage of the memory cell is the fastest immediately after the completion of the program operation, and decreases with the elapsed time. The threshold voltage is more likely to change in a memory cell in which the number of executions of the cycle of the erase operation and the program operation is larger. Moreover, the change in the threshold voltage of the memory cell can be affected not only by the elapsed time from the completion of the program operation but also by the sense operation on the memory cell, the sense operation on the adjacent memory cell, the temperature at the time of access, and the like. Since the threshold voltage of the memory cell may change, in practice, two adjacent lobes may overlap with one another in the sense operation.

Figure 5:
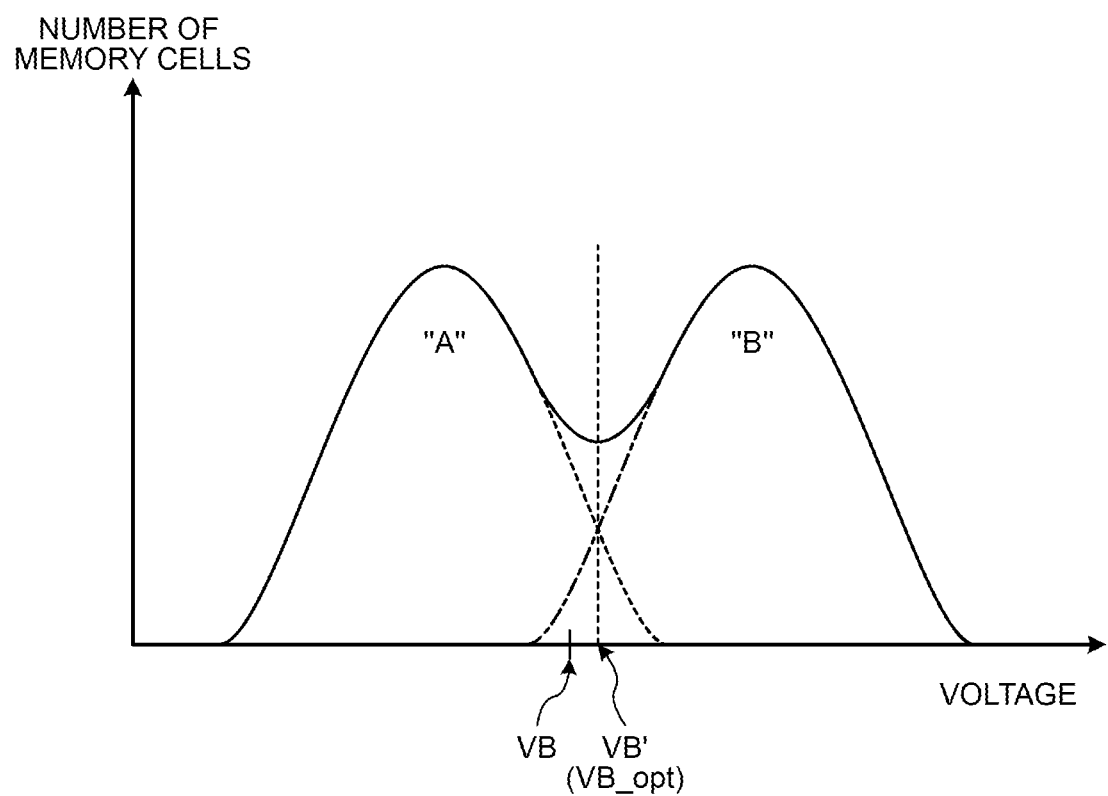
FIG. 5 is a diagram illustrating another example of a threshold voltage that can be taken by the memory cell according to the embodiment.

FIG. 5 is a diagram illustrating another example of a threshold voltage that can be taken by the memory cell according to the embodiment. Here, in order to simplify the description, a distribution of memory cells belonging to either the "A" state or the "B" state is illustrated. A solid line indicates a distribution of memory cells belonging to either the "A" state or the "B" state. A dashed line indicates a lobe of the "A" state, and an alternate long and short dash line indicates a lobe of the "B" state. In the example of the drawing, the skirt of the lobe of the "A" state and the skirt of the lobe of the "B" state overlap with one another. In other words, the maximum value of the threshold voltage of the memory cell belonging to the "A" state exceeds the read voltage VB, and the minimum value of the threshold voltage of the memory cell belonging to the "B" state is lower than the read voltage VB. In a case where a memory cell that belongs to the "A" state and has a threshold voltage higher than the read voltage VB is read, the memory cell is recognized as belonging to the "B" state. That is, data programmed as "110" is read as "100". In a case where a memory cell that belongs to the "B" state and has a threshold voltage lower than the read voltage VB is read, the memory cell is recognized as belonging to the "A" state. That is, data programmed as "100" is read as "110".

As described above, the data read by the sense operation may change from the value at the time of the program operation due to the change in the threshold voltage. The controller 200 copes with the change in the data and the threshold voltage by performing error correction and shifting the read voltage. Specifically, in the controller 200, the ECC circuit 206 performs error correction on the read data. In a case where the error correction fails, the controller 200 changes the read voltage and executes the read operation again. Note that failure of the error correction means that data before change cannot be restored from data after change. More specifically, failure in the error correction means that the error bit included in the read data cannot be corrected. Successful error correction means that all error bits included in the read data have been corrected. A read operation of changing and reading the read voltage is referred to as shift reading.

Note that the read voltage can be expressed by various amounts. In one example, a fixed value is preset for each type of read voltage (VA to VG), and the read voltage is expressed by a shift amount (that is, a difference) from the fixed value. Moreover, a fixed value is recorded at a predetermined position in the memory chip CP for each type of read voltage. In the shift reading, the controller 200 instructs the memory chip CP on the shift amount from the fixed value for each type of read voltage.

Note that the method of expressing the read voltage and the method of instructing the read voltage are not limited thereto. For example, the value of the read voltage may be expressed by a net voltage value instead of a difference, and the read voltage may be indicated to the memory chip CP as a net voltage value.

The controller 200 can acquire a value of the read voltage that can suppress the number of error bits generated in the read data. The value of the read voltage at which the number of error bits occurring in the read data can be suppressed is referred to as an optimum read voltage for convenience. For example, in a case where the threshold voltages are distributed as in the graph illustrated in FIG. 5, a voltage value VB' at which the distribution of the memory cells belonging to either the "A" state or the "B" state takes a minimum value is considered to be an optimum read voltage VB_opt related to the read voltage VB.

The controller 200 acquires the optimum read voltage in a predetermined condition as a trigger. Hereinafter, an operation of acquiring the optimum read voltage is simply referred to as an optimum value acquisition operation.

As an example of the optimum value acquisition operation, a first optimum value acquisition operation will be described. The first optimum value acquisition operation is also referred to as Vth tracking. In the first optimum value acquisition operation, a set of optimum read voltages can be individually acquired for each of the read voltages VA and VE necessary for the read operation of the lower page, the read voltages VB, VD, and VF necessary for the read operation of the middle page, and the read voltages VC and VG necessary for the read operation of the upper page. Here, as an example, an operation of acquiring the optimum read voltages for the read voltages VA and VE necessary for the read operation of the lower page will be described.

In the first optimum value acquisition operation, a plurality of shift reading in which the values of the read voltages are slightly different from each other is executed. In a case where the read voltages VA and VE, which are the read voltages necessary for the read operation of the lower page, are the measurement targets of the optimum read voltage, the controller 200 executes shift reading for reading the lower page on the memory chip CP multiple times. The controller 200 varies the respective values of the read voltages VA and VE little by little for each shift reading.

Figure 6:
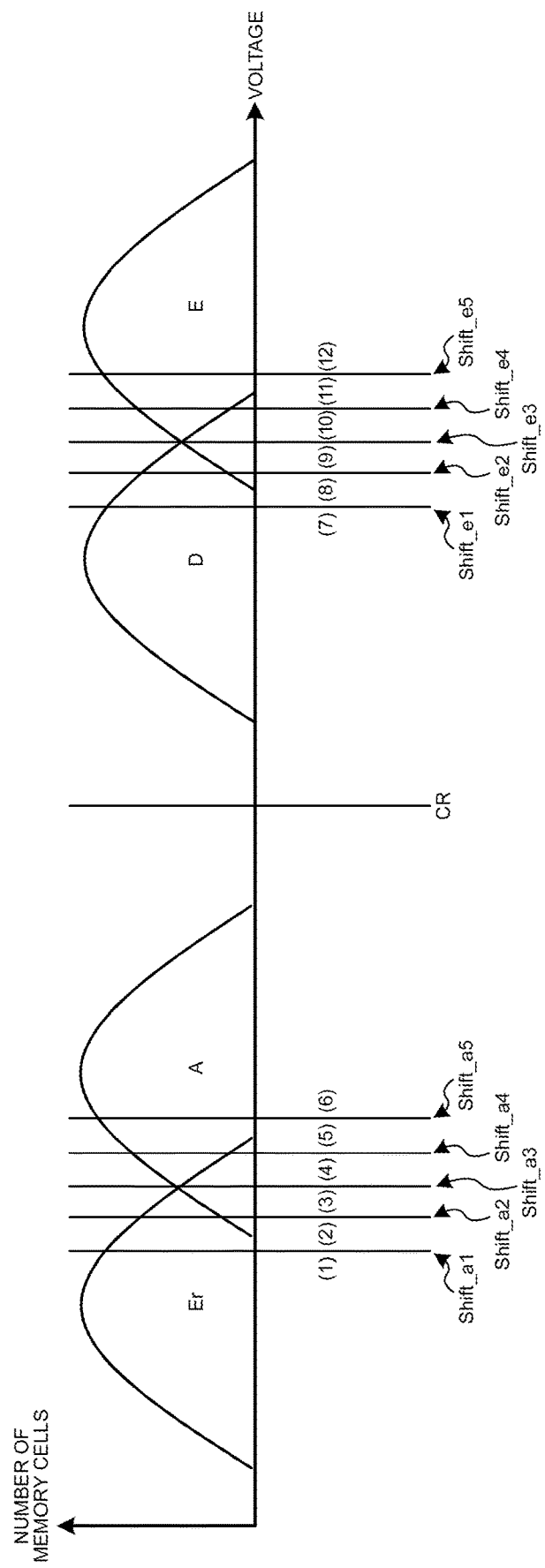
FIG. 6 is a diagram for explaining shift reading executed in a first optimum value acquisition operation according to the embodiment.

FIG. 6 is a diagram for explaining shift reading executed in the first optimum value acquisition operation according to the embodiment.

In the example of FIG. 6, five times of shift reading are executed. In the i-th (where i is an integer of 1 to 5 inclusive) shift reading (SFTi), Shift_ai is used as the read voltage VA, and Shift_ei is used as the read voltage VE. Specifically, in the first shift reading (SFT1), Shift_a1 is used as the read voltage VA, and Shift_e1 is used as the read voltage VE. In the second shift reading (SFT2), Shift_a2 is used as the read voltage VA, and Shift_e2 is used as the read voltage VE. In the third shift reading (SFT3), Shift_a3 is used as the read voltage VA, and Shift_e3 is used as the read voltage VE. In the fourth shift reading (SFT4), Shift_a4 is used as the read voltage VA, and Shift_e4 is used as the read voltage VE. In the fifth shift reading (SFT5), Shift_a5 is used as the read voltage VA, and Shift_e5 is used as the read voltage VE. A shift amount of the read voltage every time when the shift reading is executed may be constant or may not be constant. In one example, each read voltage is changed by a predetermined step width every time when the shift reading is executed.

Moreover, in the first optimum value acquisition operation, reading for acquiring mask data is executed in addition to the shift reading performed multiple times. In the sense operation in which the lower page is set as a read target, the data of the lower page is determined on the basis of the determination result AR by the A reading and the determination result ER by the E reading. The mask data is used to separate the determination result AR by the A reading and the determination result ER by the E reading from the data of the lower page obtained by the shift reading. The read for acquiring the mask data is referred to as mask data reading.

In the mask data reading, a voltage between two adjacent read voltages, which are regarded as targets for acquiring the optimum read voltage, is used as the read voltage. For example, a voltage sufficiently far from a voltage between the two adjacent read voltages as the targets for acquiring the optimum read voltage is adopted as the read voltage in the mask data reading.

Here, as an example, the read voltage VC is used in the mask data reading. That is, the C reading is performed in the mask data reading.

A range in which the threshold voltage of each memory cell can exist is divided into twelve sections in total ((1) to (12) in FIG. 6) on the basis of each read voltage used in five times of shift reading and the read voltage VC used in one time of C reading. FIG. 7 illustrates the data of the determination result obtained by the five times of shift reading (SFT1 to SFT5) and the data of the determination result obtained by the mask data reading for each section. Note that, here, as an example, in the determination result by the mask data reading, "0" indicates that the memory cell is in an on state, and "1" indicates that the memory cell is in an off state in the processing circuit 110.

For example, a memory cell in which the threshold voltage is included in section (3) is considered. The processing circuit 110 acquires "0" from the memory cell by the mask data reading (here, the C reading). Moreover, in the processing circuit 110, the lower bit held by the memory cell is determined to be "0" according to the shift reading SFT1 and the shift reading SFT2, and is determined to be "1" according to the shift reading SFT3, the shift reading SFT4, and the shift reading SFT5.

Moreover, for example, the memory cell of which the threshold voltage is included in section (1) and the memory cell of which the threshold voltage is included in section (12) can obtain the same result by five times of shift reading, but the determination result by the mask data reading is different. That is, the memory cell of which the threshold voltage is included in section (1) and the memory cell of which the threshold voltage is included in section (12) can be identified by the mask data reading.

When the determination result by the C reading related to a certain memory cell is "0", it indicates that the memory cell belongs to the Er state or the A state, that is, is included in sections (1) to (6). When the determination result of the C reading related to a certain memory cell is "1", it indicates that the memory cell belongs to D state or E state, that is, the memory cell is included in sections (7) to (12). By performing the mask processing using the determination result CR by the C reading on the read data by the shift reading, it is possible to acquire the determination result AR of the A reading for the memory cell belonging to the Er state or the A state and the determination result ER of the E reading for the memory cell belonging to the D state or the E state.

Figure 8:
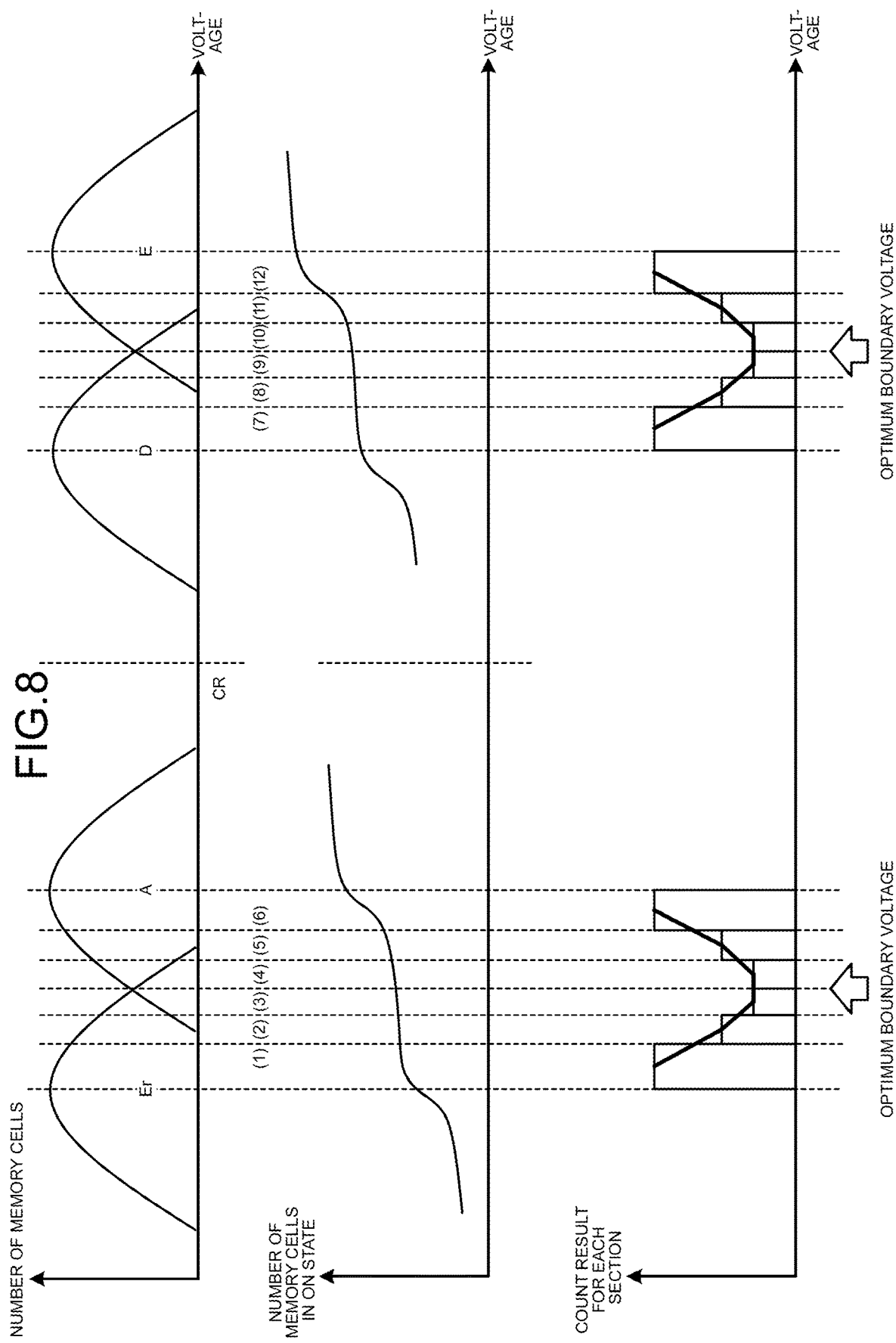
FIG. 8 is a diagram for explaining processing of acquiring an optimum read voltage in the first optimum value acquisition operation of the embodiment.

The controller 200 acquires the determination result AR of the A reading for each of the five times of shift reading by masking the determination result obtained from the memory cell belonging to the D state or the E state by using the determination result CR by the C reading for the read data of the five times of shift reading. Then, the controller 200 calculates the number of memory cells whose threshold voltage is lower than Shift_a1, the number of memory cells whose threshold voltage is lower than Shift_a2, the number of memory cells whose threshold voltage is lower than Shift_a3, the number of memory cells whose threshold voltage is lower than Shift_a4, and the number of memory cells whose threshold voltage is lower than Shift_a5 out of the memory cells belonging to the Er state or the A state on the basis of the determination result AR acquired for each of the five times of shift reading. Moreover, the controller 200 acquires the determination result ER of the E reading for each of the five times of shift reading by masking the determination result obtained from the memory cell belonging to the Er state or the A state by using the determination result CR by the C reading for the read data of the five times of shift reading on the basis of the determination result ER acquired for each of the five times of shift reading. Then, the controller 200 calculates the number of memory cells whose threshold voltage is lower than Shift_e1, the number of memory cells whose threshold voltage is lower than Shift_e2, the number of memory cells whose threshold voltage is lower than Shift_e3, the number of memory cells whose threshold voltage is lower than Shift_e4, and the number of memory cells whose threshold voltage is lower than Shift_e5 out of the memory cells belonging to the D state or the E state on the basis of the determination result ER acquired for each of the five times of shift reading. The middle graph of FIG. 8 is a graph plotting the number of memory cells calculated by such an operation.

Subsequently, the controller 200 calculates the number of memory cells included in each of sections (1) to (12) on the basis of the number of memory cells whose threshold voltage is lower than Shift_a1, the number of memory cells whose threshold voltage is lower than Shift_a2, the number of memory cells whose threshold voltage is lower than Shift_a3, the number of memory cells whose threshold voltage is lower than Shift_a4, the number of memory cells whose threshold voltage is lower than Shift_a5, the number of memory cells whose threshold voltage is lower than Shift_e1, the number of memory cells whose threshold voltage is lower than Shift_e2, the number of memory cells whose threshold voltage is lower than Shift_e3, the number of memory cells whose threshold voltage is lower than Shift_e4, and the number of memory cells whose threshold voltage is lower than Shift_e5. The lower graph of FIG. 8 is a graph plotting the number of memory cells included in each of sections (1) to (12).

A graph plotting the number of memory cells included in each of sections (1) to (12) can be considered as approximation of a distribution of memory cells belonging to either the Er state or the A state and a distribution of memory cells belonging to either the D state or the E state. Therefore, the controller 200 acquires a voltage value at which the number of memory cells takes a minimum value in the range of sections (1) to (6) out of the number of memory cells included in each of sections (1) to (12) as the optimum read voltage VA_opt related to the read voltage VA. Moreover, the controller 200 acquires a voltage value at which the number of memory cells takes a minimum value in the range of sections (7) to (12) out of the number of memory cells included in each of sections (1) to (12) as the optimum read voltage VE_opt related to the read voltage VE.

In the case of measuring the optimum read voltages for the read voltages VB, VD, and VF necessary for the read operation of the middle page, the optimum read voltages of the read voltages VB, VD, and VF can be measured by multiple times of shift reading with the middle page as a read target, mask data reading using a voltage (for example, VC) between the read voltages VB and VD as a read voltage, and mask data reading using a voltage (for example, VE) between the read voltages VD and VF as a read voltage.

Moreover, in a case where the optimum read voltages are measured for the read voltages VC and VG necessary for the read operation of the upper page, the optimum read voltages of the read voltages VC and VG can be measured by multiple times of shift reading in which the upper page is set as a read target and the mask data reading in which the voltage (for example, VE) between the read voltages VC and VG is set as a read voltage.

As described above, according to the first optimum value acquisition operation, whether the plurality of memory cells are in an on state or an off state is determined multiple times while varying the value of the read voltage, and the optimum read voltage is acquired on the basis of a group of the determination results.

Note that, in the first optimum value acquisition operation, the mask data reading may not necessarily be performed. For example, the processing circuit 110 may perform shift reading multiple times while varying the read voltage of a single type little by little to acquire approximation of a distribution of memory cells around the read voltage of the single type, and acquire the optimum read voltage of the read voltage of the single type on the basis of the acquired approximation of the distribution of the memory cells.

As another example of the optimum value acquisition operation, a second optimum value acquisition operation will be described.

In the second optimum value acquisition operation, the controller 200 compares the read data (referred to as data before correction) acquired from the NAND flash memory 100 and not subjected to any error correction with the read data (referred to as data after correction) corrected to the data expected by the error correction. Then, the controller 200 acquires an evaluation index on the basis of the number of bits in which the data corresponding to the "Si" state is erroneously read as the data corresponding to the "Si+1" state adjacent to the "Si" state and the number of bits in which the data corresponding to the "Si+1" state is erroneously read as the data corresponding to the "Si" state. Then, the controller 200 calculates a voltage value of the read voltage corresponding to the boundary between the "Si" state and the "Si+1" state, which can suppress the number of occurrence of error bits, on the basis of the evaluation index.

Hereinafter, a bit in which data corresponding to the "Si" state is erroneously read as data corresponding to the "Si+1" state is referred to as a bit SitoSi+1. A bit in which data corresponding to the "Si+1" state is erroneously read as data corresponding to the "Si" state is referred to as a bit Si+1toSi. Moreover, the number of bits SitoSi+1 is expressed as a count SitoSi+1. Moreover, the number of bits Si+1toSi is expressed as a count Si+1toSi.

Figure 9:
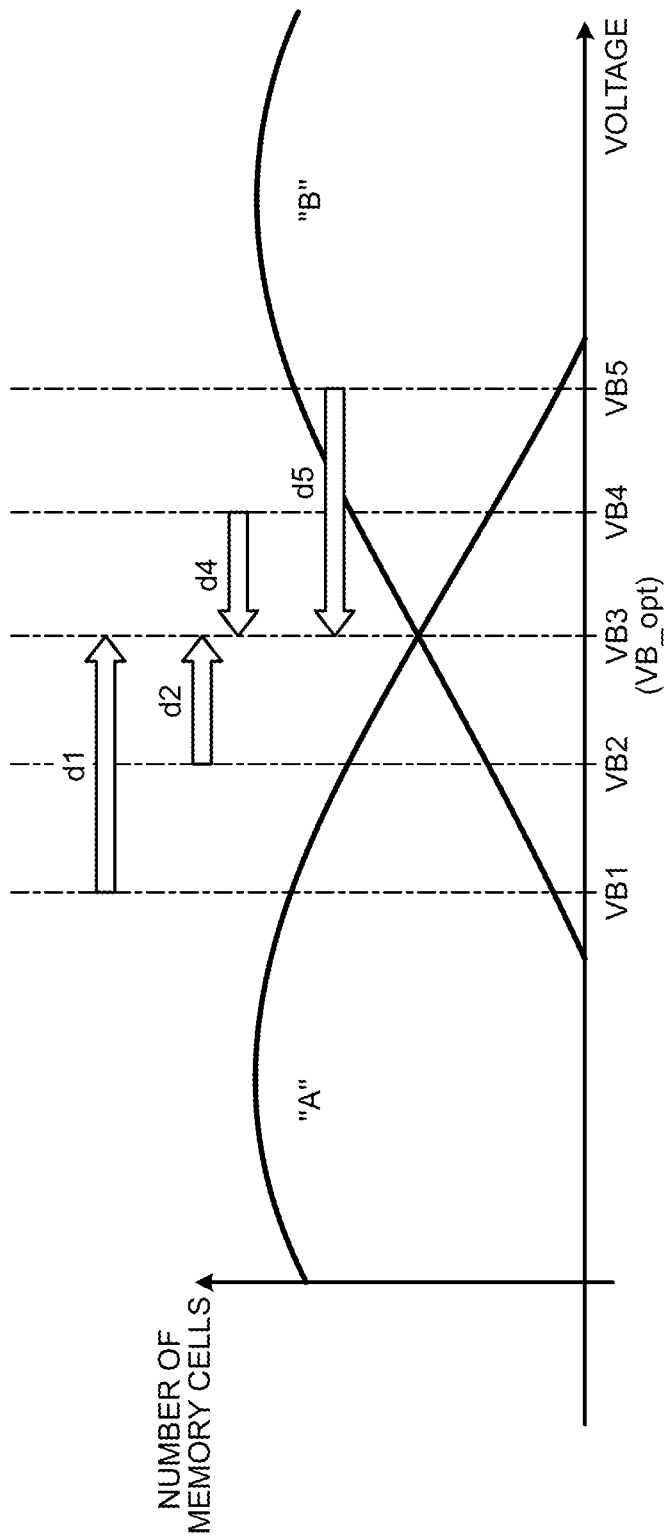
FIG. 9 is a diagram for explaining a second optimum value acquisition operation according to the embodiment.
Figure 10:
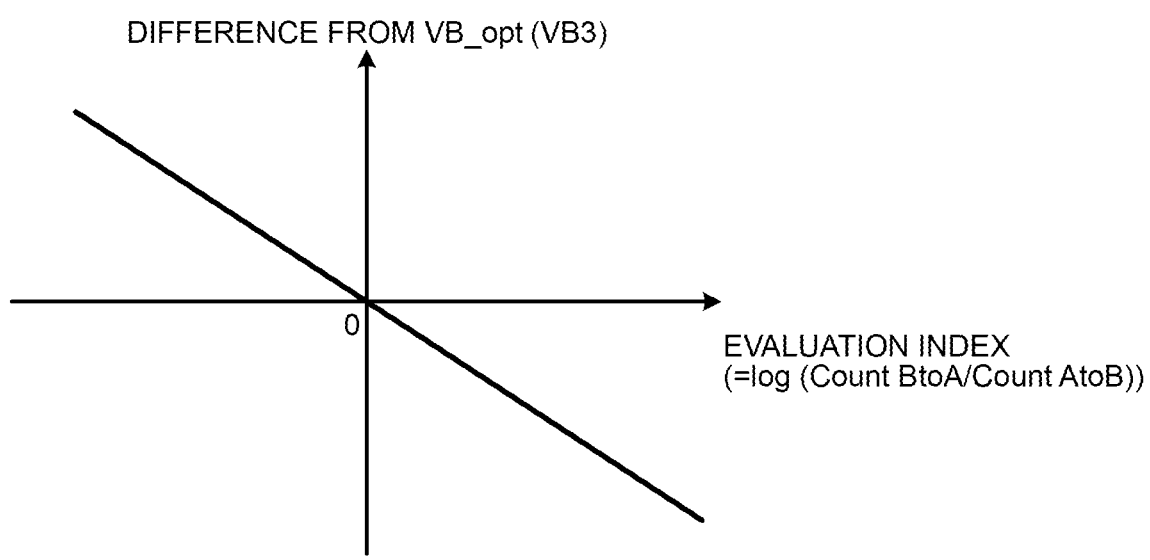
FIG. 10 is a diagram for explaining the second optimum value acquisition operation according to the embodiment.

FIGS. 9 and 10 are diagrams for explaining the second optimum value acquisition operation according to the embodiment. In FIGS. 9 and 10, examples of two adjacent states include an "A" state and a "B" state.

In FIG. 9, a lobe related to the "A" state and a lobe related to the "B" state are depicted. The two lobes change with various factors and overlap with one another. When the read operation is executed by using each of voltages VB1 to VB5 as the read voltage for such two lobes, a ratio between the number of bits AtoB (that is, a count AtoB) and the number of bits BtoA (that is, a count BtoA) changes with the read voltages.

In a case where VB3 is used as the read voltage, the count AtoB is equal to the count BtoA. In a case where VB4 or VB5 is used as the read voltage, the count AtoB is smaller than the count BtoA. In a case where VB5 is used as the read voltage, a difference between the count AtoB and the count BtoA is larger than that in a case where VB4 is used as the read voltage. In a case where VB1 or VB2 is used as the read voltage, the count AtoB is greater than the count BtoA. In a case where VB1 is used as the read voltage, a difference between the count AtoB and the count BtoA is larger than that in a case where VB2 is used as the read voltage.

In a case where the voltage VB3 at which the count AtoB is equal to the count BtoA is used as the read voltage, the number of error bits can be minimized. That is, the voltage VB3 is considered to correspond to an optimum value VB_opt of the read voltage VB. Then, as the read voltage VB becomes larger than the voltage VB3, the ratio of the count AtoB to the count BtoA becomes larger. As the read voltage VB becomes smaller than the voltage VB3, the ratio of the count AtoB to the count BtoA becomes smaller.

FIG. 10 is a graph illustrating a relationship between the common logarithm of the ratio of the count AtoB to the count BtoA and differences d1 to d5 between the voltage VB_opt (that is, VB3) and the voltages VB1 to VB5. According to this example, it can be read that the common logarithm of the ratio of the count AtoB to the count BtoA and the differences d1 to d5 have a linear relationship.

The designer causes the controller 200 to hold a relational formula illustrated in FIG. 10 as it is or in the form of a table or the like. The controller 200 acquires the count AtoB and the count BtoA on the basis of the comparison between the data before correction and the data after correction. Then, the controller 200 calculates the common logarithm of the ratio of the count AtoB to the count BtoA as the evaluation index. Then, the controller 200 calculates a difference voltage with which the common logarithm of the ratio of the count AtoB to the count BtoA can be set to 0 as the evaluation index on the basis of the evaluation index acquired by the calculation and the relational formula. Then, the controller 200 acquires the voltage VB_opt by applying the acquired differential voltage to the value of the read voltage used to acquire the read data.

The controller 200 performs a read operation on each of the lower page, the middle page, and the upper page in one memory cell group MSG to acquire a pair of the data before correction and the data after correction for each page. Then, the controller 200 specifies a memory cell corresponding to the bit SitoSi+1 and a memory cell corresponding to the bit Si+1toSi for each state boundary on the basis of the set of data before correction for all pages and the set of data after correction for all pages. Then, the controller 200 calculates the count SitoSi+1 and the count Si+1toSi for each state boundary. The controller 200 acquires the optimum read voltages of the read voltages VA to VG on the basis of the pair of the count SitoSi+1 and the count Si+1toSi calculated for each state boundary.

Note that, in order to acquire the optimum read voltages for all the read voltages AR to GR, it is necessary to read data from all pages of one memory cell group MSG as described above. In the second optimum value acquisition operation, similarly to the first optimum value acquisition operation, the optimum read voltage can be acquired only for the read voltage necessary for the read operation of a specific page out of the read voltages AR to GR by using the mask data.

For example, a bit changed from "0" to "1" by error correction on read data from the lower page is either a bit AtoEr or a bit DtoE. Moreover, the bit changed from "1" to "0" by error correction on the read data from the lower page is either a bit ErtoA or a bit EtoD. The controller 200 masks the bit read from the memory cell belonging to the D state or the E state in the read data from the lower page by using, for example, a determination result CR by the C reading, thereby specifying the bit AtoEr out of the bits changed from "0" to "1" and the bit ErtoA out of the bits changed from "1" to "0". Moreover, the controller 200 masks the bit read from the memory cell belonging to the Er state or the A state in the read data from the lower page by using, for example, the determination result CR by the C reading, thereby specifying the bit DtoE out of the bits changed from "0" to "1" and the bit EtoD out of the bits changed from "1" to "0". The controller 200 calculates the optimum read voltage VA_opt of the read voltage VA on the basis of the number of bits AtoEr and the number of bits ErtoA. Moreover, the controller 200 calculates the optimum read voltage VE_opt of the read voltage VE on the basis of the number of bits DtoE and the number of bits EtoD.

As described above, in the second optimum value acquisition operation, the optimum read voltage is acquired on the basis of the comparison between the read data before the error correction and the read data after the error correction.

In the first optimum value acquisition operation and the second optimum value acquisition operation, a result of at least one read operation (that is, read data) is used. In the read operation, read data is acquired by using a determination result obtained by determining whether a memory cell is in an on state or an off state by using at least one read voltage. Therefore, the first optimum value acquisition operation and the second optimum value acquisition operation can be considered as an operation of determining whether the memory cell is in the on state or the off state by using the read voltage, and acquiring the optimum read voltage on the basis of the determination result.

As described above, the threshold voltage of the memory cell can change with various factors. One of the factors of the change in the threshold voltage of the memory cell is a temperature of the memory chip CP at the time of accessing the memory cell array 111.

The memory chip itself may have a function of autonomously changing the read voltage so as to cancel the change in the threshold voltage. However, even if such a function is used, it is difficult to completely cancel the change in the threshold voltage. In a case where the change in the threshold voltage cannot be completely canceled, the number of error bits included in the read data increases. Then, an increase amount of the number of error bits due to the failure to completely cancel the change in the threshold voltage tends to be larger as the number of bits of data written per memory cell is larger.

FIG. 11 is a diagram illustrating an example of temperature dependency of a read voltage in a certain memory chip CP according to the embodiment. Part (A) of this drawing is a graph illustrating the threshold voltage distribution and the read voltage of the memory cell in a case where a certain temperature (here, 50° C. as an example) is set as a reference temperature and the temperature of the memory chip CP is higher than the reference temperature. Part (B) of this drawing is a graph illustrating the threshold voltage distribution and the read voltage of the memory cell in a case where the temperature of the memory chip CP is the reference temperature. Part (C) of this drawing is a graph illustrating the threshold voltage distribution and the read voltage of the memory cell in a case where the temperature of the memory chip CP is lower than the reference temperature.

In the example illustrated in FIG. 11, the higher the temperature, the more the lobe of each state is shifted to a negative voltage side. This indicates that it is necessary to shift each read voltage to the negative voltage side as the temperature is higher in order to suppress the number of error bits included in the read data. That is, even if an optimum read voltage is acquired at a certain temperature, when the acquired optimum read voltage is used at another temperature, it is required to correct the optimum read voltage in accordance with a difference between a temperature at the time of acquiring the optimum read voltage and a temperature at the time of using the optimum read voltage.

Note that the memory chip CP may or may not have a function of changing the read voltage in accordance with the temperature so as to cancel the change in the threshold voltage. In a case where the memory chip CP does not have a function of changing the read voltage in accordance with the temperature, it can be considered that the temperature-dependent variation of each lobe and each read voltage illustrated in FIG. 11 represents the actual temperature-dependent variation of each lobe and each read voltage. In a case where the memory chip CP has a function of changing the read voltage in accordance with the temperature information, it can be considered that the variation due to the temperature of each lobe and each read voltage illustrated in FIG. 11 represents a component that cannot be canceled by the function of the memory chip CP in the actual variations due to the temperature of each lobe and each read voltage.

In the read operation, the controller 200 changes the read voltage instructed to the memory chip CP in accordance with the temperature at the time of the read operation. Specifically, when acquiring a voltage value as the optimum read voltage by the optimum value acquisition operation, the controller 200 converts the acquired voltage value as the optimum read voltage into a voltage value at the reference temperature on the basis of the temperature information at the time of acquisition, and stores the voltage value. When the read operation is performed thereafter, the controller 200 corrects the stored voltage value at the reference temperature on the basis of the temperature at the time of the read operation, and executes the read operation using the corrected voltage value as the read voltage.

Note that the reference temperature is an example of a temperature set value.

A technique to be compared with the embodiment will be described. A technique to be compared with the embodiment is referred to as a comparative example. According to the comparative example, when the optimum read voltage is used in the read operation, a memory controller corrects the optimum read voltage on the basis of the temperature information at the time of executing the optimum value acquisition operation in which the optimum read voltage is acquired and the temperature information at the time of executing the read operation, and uses the corrected optimum read voltage. However, according to this comparative example, it is necessary to store the temperature at the time of executing the optimum value acquisition operation, and the management for changing the read voltage in accordance with the temperature becomes complicated.

According to the embodiment, the controller 200 converts the optimum read voltage acquired by the optimum value acquisition operation into a voltage value at the reference temperature and stores the voltage value. Therefore, it is not necessary to store the temperature at the time of executing the optimum value acquisition operation, and the management for changing the read voltage in accordance with the temperature is simplified.

Hereinafter, the voltage value at the reference temperature converted from the voltage value that is the optimum read voltage is referred to as a reference read voltage. A voltage value obtained by correcting the voltage value, which is the reference read voltage, on the basis of the temperature in the read operation is referred to as a correction read voltage. The optimum read voltage means a voltage value acquired by the optimum value acquisition operation unless otherwise specified.

When converting the optimum read voltage into the reference read voltage or converting the reference read voltage into the correction read voltage, the controller 200 uses temperature correction information corresponding to the temperature dependency of the threshold voltage of the memory cell.

Figure 12:
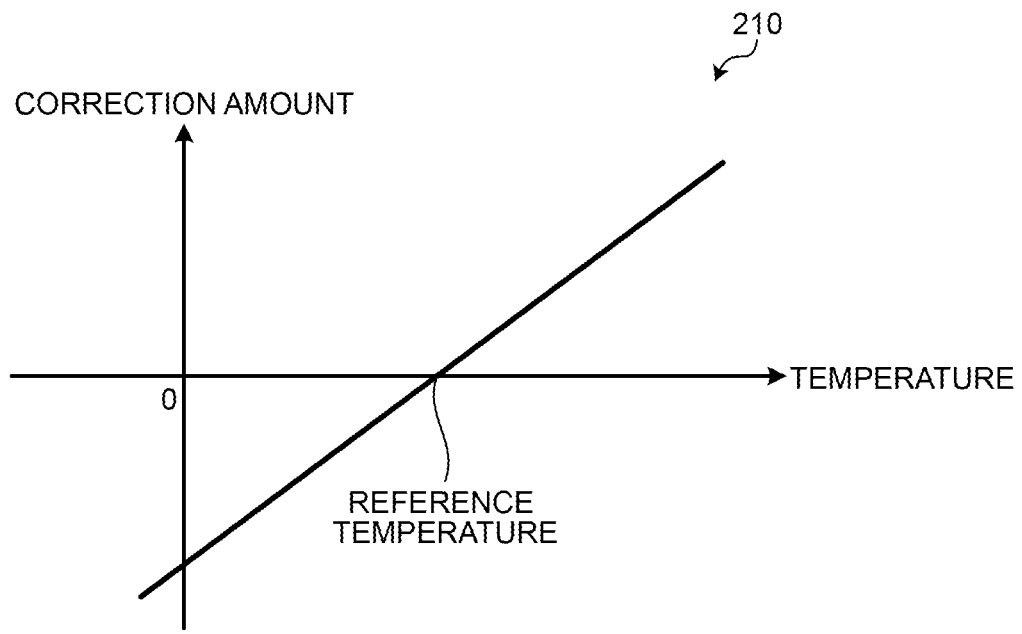
FIG. 12 is a diagram illustrating an example of temperature correction information according to the embodiment.

FIG. 12 is a diagram illustrating an example of temperature correction information 210 according to the embodiment. In the example illustrated in the drawing, the temperature correction information 210 indicates a relationship between a temperature and a correction amount.

In the temperature correction information 210, the correction amount is 0 at the reference temperature. In this example, the relationship between the temperature and the correction amount is defined as a linear function in which the correction amount increases in accordance with the temperature.

For example, when converting the optimum read voltage into the reference read voltage, the controller 200 acquires the correction amount corresponding to the temperature at the time of acquiring the optimum read voltage on the basis of the temperature correction information 210. Then, the controller 200 acquires the reference read voltage by adding the correction amount to the optimum read voltage.

Moreover, in the read operation, the controller 200 acquires the correction amount corresponding to the temperature in the read operation on the basis of the temperature correction information 210. Then, the controller 200 acquires the correction read voltage by subtracting the correction amount from the reference read voltage.

Note that the relationship between the temperature defined by the temperature correction information 210 and the correction amount is not limited to the example illustrated in FIG. 12. As long as the temperature correction information 210 corresponds to the temperature dependency of the memory cell and is information that can convert or correct the read voltage on the basis of the temperature dependency, the format of the temperature correction information 210 is not limited to a specific format. The temperature correction information 210 may be information expressed as a mathematical formula or information in a table format.

Moreover, the temperature correction information 210 may define the relationship between the temperature and the correction amount for each of the read voltages VA to VG. Moreover, a plurality of or all the read voltages VA to VG may share the information.

Note that the temperature dependency of the threshold voltage of the memory cell can be different for each memory chip CP. Therefore, for example, the temperature correction information 210 is individually generated for each memory chip CP by the manufacturer of the memory chip CP. The temperature correction information 210 of each memory chip CP is stored, for example, in a predetermined area of the memory chip CP.

Figure 13:
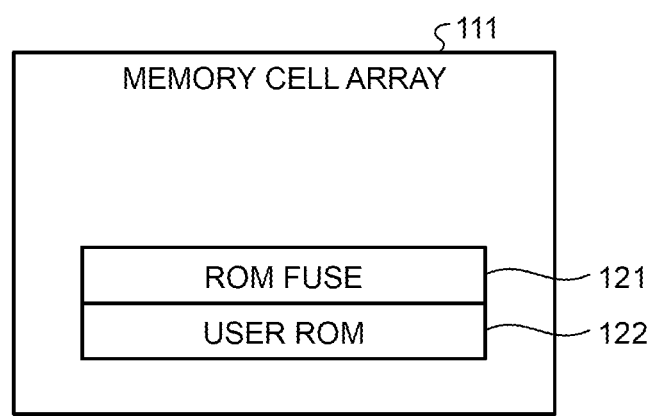
FIG. 13 is a diagram illustrating an example of a configuration of a memory cell array according to the embodiment.

As illustrated in FIG. 13, the memory cell array 111 includes a ROM fuse 121 and a user ROM 122.

Various pieces of setting information necessary for normally controlling the memory chip CP are stored in the ROM fuse 121 in advance by the manufacturer of the memory chip CP. In one example, defective block information is stored in the ROM fuse 121. In a manufacturing process, a block having a defect exceeding an allowable level is detected as a defective block. The defective block information is information in which a list of detected defective blocks is recorded. The controller 200 acquires the defective block information from the memory chip CP, and prohibits the use of the block recorded in the acquired defective block information.

In the user ROM 122, various types of setting information that can be used for controlling the memory chip CP but is not essential for the control are stored in advance by the manufacturer of the memory chip CP. In one example, the temperature correction information 210 is stored in the user ROM 122. The controller 200 loads the temperature correction information 210 from the user ROM 122 to the RAM 202, and refers to the temperature correction information 210 loaded to the RAM 202 in a timely manner.

In the correspondence relationship defined by the temperature correction information 210, the "temperature" is, for example, the temperature of the memory chip CP. In this case, the controller 200 acquires the temperature used for the search for acquiring the correction amount from the temperature correction information 210 from the temperature sensor 112 provided in the memory chip CP. That is, when acquiring the correction amount on the basis of the temperature correction information 210, the controller 200 transmits a command for requesting the output of the temperature detection value to the memory chip CP.

Figures 14, 15:
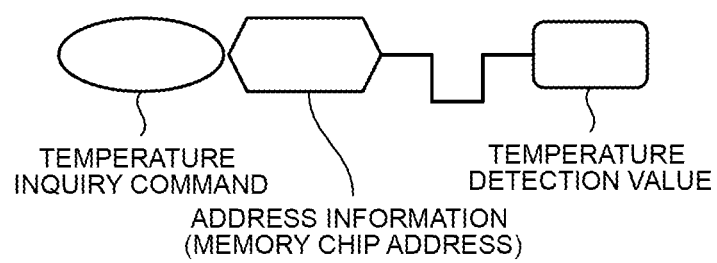
FIG. 14 is a diagram illustrating an example of a command sequence for acquiring a temperature detection value from a memory chip CP according to the embodiment.
FIG. 15 is a diagram illustrating an example of a management method of a reference read voltage according to the embodiment.

FIG. 14 is a diagram illustrating an example of a command sequence for acquiring a temperature detection value from the memory chip CP according to the embodiment. In the example illustrated in this drawing, the controller 200 transmits a temperature inquiry command and address information including at least a memory chip address indicating the memory chip CP that outputs a temperature detection value to the memory chip CP in this order. The memory chip CP acquires a temperature detection value from the temperature sensor 112 provided therein. The state of the memory chip CP is maintained in a busy state in a period in which the temperature detection value is acquired. Upon completing the acquisition of the temperature detection value, the memory chip CP transitions to a ready state and outputs the temperature detection value to the controller 200.

The controller 200 acquires the correction amount by referring to the temperature correction information 210 using the acquired temperature detection value.

Note that, in the correspondence relationship defined by the temperature correction information 210, the "temperature" may be a temperature at an optional position different from the memory chip CP as long as there is a correlation with the temperature of the memory chip CP. For example, in a case where there is a correlation between the temperature of the controller 200 and the temperature of the memory chip CP, the temperature correction information 210 may be configured to be able to acquire the correction amount from the temperature of the controller 200. In this case, the controller 200 acquires a temperature detection value from the temperature sensor 207 installed the controller itself. The correction amount can be acquired by making reference to the temperature correction information 210 along with the acquired temperature detection value.

The place where the temperature correction information 210 is stored in advance is not limited to the user ROM 122 of each memory chip CP. Moreover, one piece of temperature correction information 210 may be shared among two or more memory chips CP (for example, all the memory chips CP). Moreover, a plurality of pieces of temperature correction information 210 may be provided per memory chip CP. For example, the temperature correction information 210 may be provided for each plane.

FIG. 15 is a diagram illustrating an example of a method of managing a reference read voltage according to the embodiment.

In the example illustrated in FIG. 15, one set of reference read voltages is stored in association with one block. The set of reference read voltages includes a reference read voltage related to the read voltage VA, a reference read voltage related to the read voltage VB, a reference read voltage related to the read voltage VC, a reference read voltage related to the read voltage VD, a reference read voltage related to the read voltage VE, a reference read voltage related to the read voltage VF, and a reference read voltage applied to the read voltage VG. The set of reference read voltages is recorded in a reference read voltage table 211 for each block, and is updated as appropriate.

The reference read voltage table 211 is stored in, for example, the RAM 202 and updated on the RAM 202. At the time of power-off, the reference read voltage table 211 in the RAM 202 may or may not be transferred to a predetermined non-volatile storage area (for example, the NAND flash memory 100).

Note that the set of reference read voltages is not necessarily managed in units of blocks. The set of reference read voltages may be managed in units of storage areas larger than blocks, or the set of reference read voltages may be managed in units of storage areas smaller than blocks.

Figure 16:
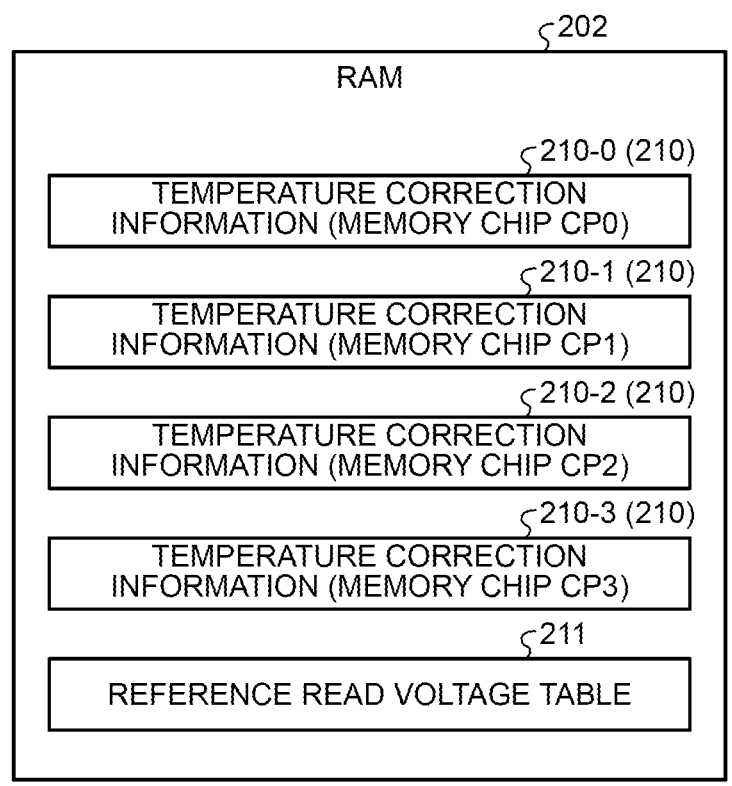
FIG. 16 is a diagram illustrating an example of information held in a RAM in an operation of the memory system according to the embodiment.

FIG. 16 is a diagram illustrating an example of information held in the RAM 202 in the operation of the memory system 1 according to the embodiment. As illustrated in the drawing, in the operation, the RAM 202 holds temperature correction information 210-0 acquired from the memory chip CP0, temperature correction information 210-1 acquired from the memory chip CP1, temperature correction information 210-2 acquired from the memory chip CP2, and temperature correction information 210-3 acquired from the memory chip CP3. Moreover, the reference read voltage table 211 is held in the RAM 202.

Note that the temperature correction information 210 is an example of first information. The reference read voltage table 211 is an example of second information. The RAM 202 is an example of a second memory configured to store the first information, and is also an example of a third memory configured to store the second information. The second memory and the third memory may be configured by one RAM 202 as in the embodiment, or may be configured by different memories.

Next, an operation of the memory system 1 of the embodiment will be described.

Figure 17:
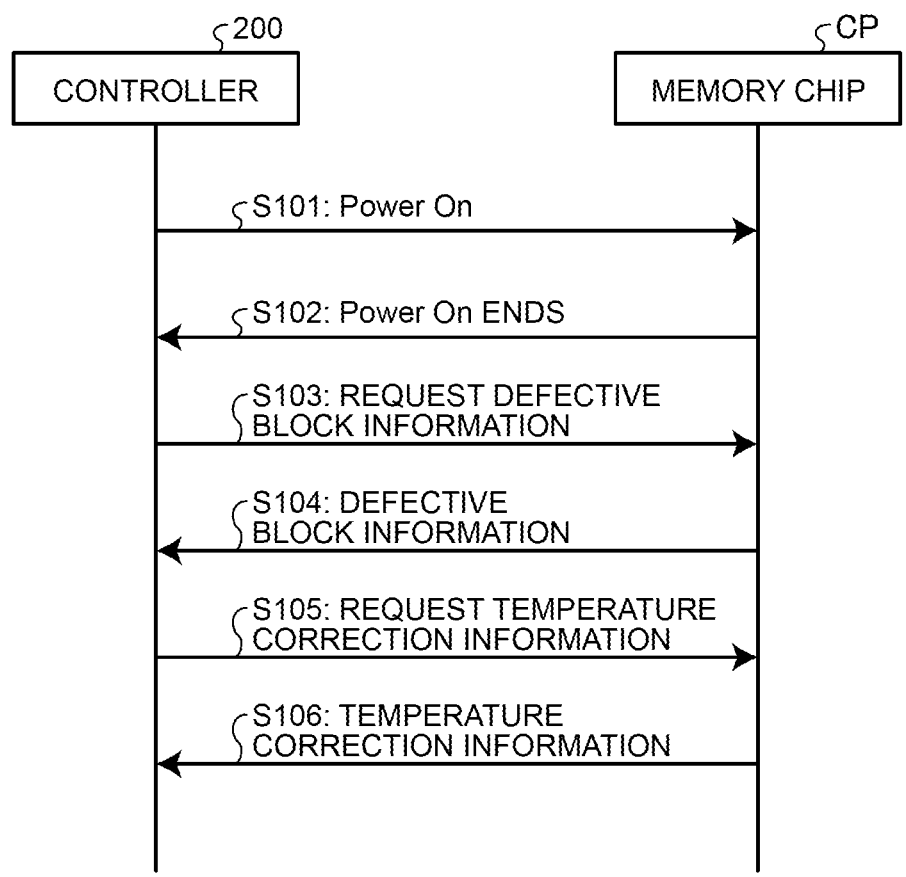
FIG. 17 is a diagram illustrating an example of an operation at the time of startup of the memory system according to the embodiment.

FIG. 17 is a diagram illustrating an example of an operation at the time of startup of the memory system 1 according to the embodiment.

When the memory system 1 is powered on, the controller 200 powers on each memory chip CP (S101). In FIG. 17, an operation on one memory chip CP is depicted in order to simplify the drawing.

When the memory chip CP completes the processing corresponding to the power-on, the controller 200 is notified that the power-on has been completed (S102).

In response to the notification of the completion of the power-on, the controller 200 requests the defective block information (S103).

In the memory chip CP, the management information stored in the ROM fuse 121 including the defective block information is read from the ROM fuse 121 and set in a predetermined register in the memory chip CP in power-on processing. The memory chip CP outputs the defective block information in the management information in the register in response to the request received by the processing of S103 (S104).

Subsequently, the controller 200 requests the temperature correction information 210 (S105). In response to the request received by the processing of S105, the memory chip CP reads the temperature correction information 210 stored in the user ROM 122 and outputs the temperature correction information 210 (S106). The controller 200 stores the acquired temperature correction information 210 in the RAM 202.

As described above, in one example, the controller 200 acquires the temperature correction information 210 from each memory chip CP at the time of startup.

Figure 18:
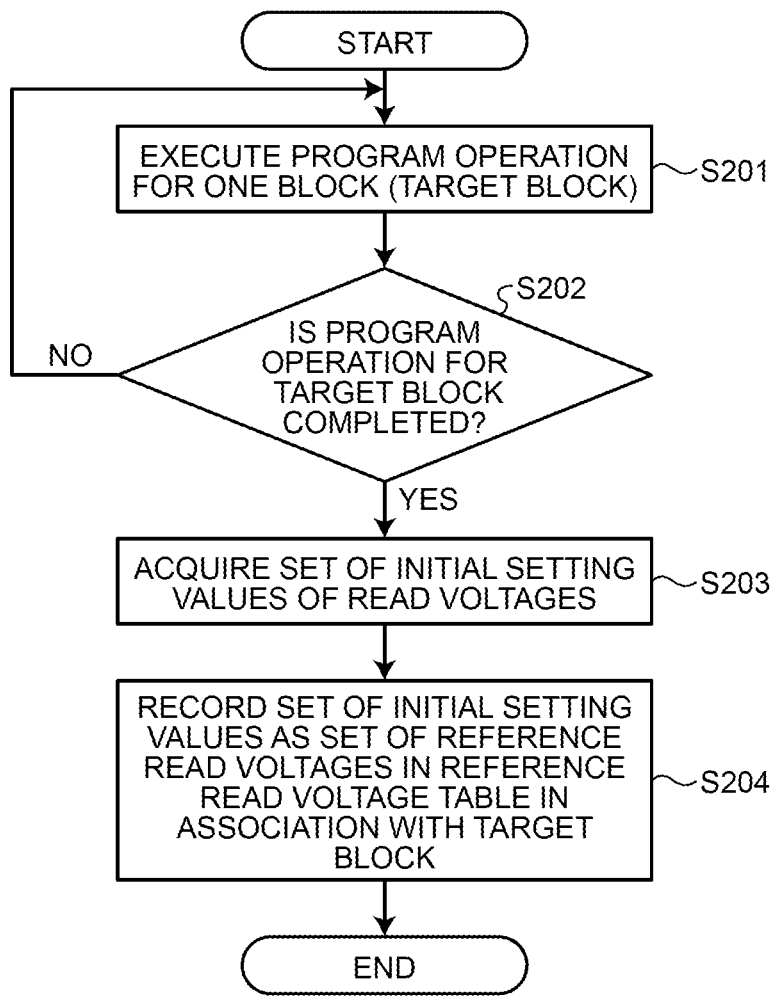
FIG. 18 is a flowchart illustrating an example of an operation of the memory system of the embodiment at the time of a program operation.

FIG. 18 is a flowchart illustrating an example of the operation of the memory system 1 of the embodiment at the time of the program operation.

The controller 200 executes a program operation on one block (S201). The block on which the processing of S201 is executed is denoted as a target block in FIG. 18. The processing of S201 is repeatedly executed until there is no free space in the target block.

The controller 200 determines whether or not the program operation on the target block is completed (S202). The completion of the program operation on the target block means, for example, that the target block stores data to the full extent and there is no area in which another data can be stored.

In response to determining that the program operation on the target block is not completed (S202: No), the controller 200 executes the processing of S201 again.

In response to determining that the program operation on the target block is completed (S202: Yes), the controller 200 acquires a set of initial setting values of the read voltages (S203). Then, the controller 200 records the set of initial setting values of the read voltages as the set of reference read voltages in the reference read voltage table 211 in association with the target block (S204), and ends the operation.

Note that the set of initial setting values of the read voltages is set in advance. The set of the initial setting values of the read voltages is common to all the memory chips CP, for example. In a case where a fixed value is set in advance for each type of read voltages (VA to VG) in each memory chip CP and the read voltages are managed as a shift amount (that is, a difference) from the fixed value in the controller 200, the set of the initial setting values of the read voltages is all 0. Note that the example of the set of the initial setting values of the read voltages is not limited thereto.

In the embodiment, as an example, the set of reference setting values is recorded in units of blocks. Therefore, as illustrated in FIG. 18, in a case where the program operation on one block is completed and thereafter the program operation on the block is not executed until the erase operation is executed, the set of the initial setting values of the read voltages is recorded in the reference read voltage table 211.

Figure 19:
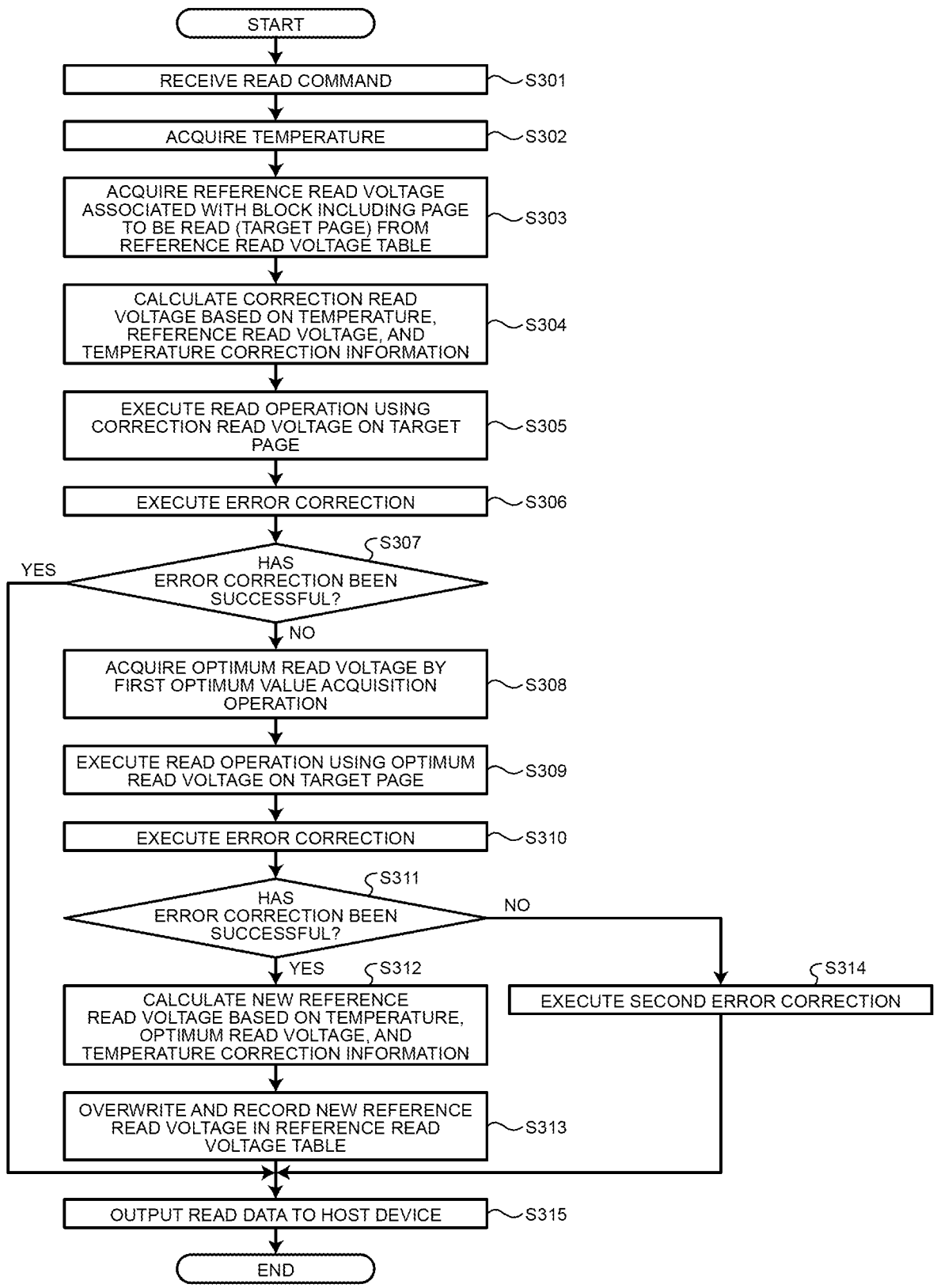
FIG. 19 is a flowchart illustrating an example of an operation of the memory system according to the embodiment in response to a read command from a host device.

FIG. 19 is a flowchart illustrating an example of an operation of the memory system 1 according to the embodiment in response to a read command from the host device 300.

Upon receiving a read command from the host device 300 (S301), the controller 200 acquires a temperature for use in reference to the temperature correction information 210 (S302). The temperature is, for example, a temperature detection value by the temperature sensor 112 or a temperature detection value by the temperature sensor 207. Note that, in the description of FIG. 19, the page to be read by the read command received in S301 is referred to as a target page.

The controller 200 acquires the reference read voltage associated with the block including the target page from the reference read voltage table 211 (S303). In S303, the controller 200 acquires a type of reference read voltage necessary for the read operation on the target page from among the set of the reference read voltages associated with the block including the target page. Note that, in the description of FIG. 19, the read voltages including the reference read voltage and the correction read voltage indicate the types of read voltages necessary for the read operation on the target page out of the read voltages VA to VG unless otherwise specified.

The controller 200 calculates a correction read voltage on the basis of the temperature acquired in the processing of S302, the reference read voltage acquired in the processing of S303, and the temperature correction information 210 (S304). Then, the controller 200 executes the read operation using the correction read voltage on the target page (S305).

The controller 200 executes error correction on the read data acquired by the read operation (S306). In S306, the controller 200 executes error correction by the ECC circuit 206, for example.

The controller 200 determines whether or not the error correction has been successful (S307). In response to determining that the error correction has failed (S307: No), the controller 200 acquires the optimum read voltage by the first optimum value acquisition operation (S308). The controller 200 executes the read operation using the optimum read voltage on the target page (S309). Then, the controller 200 executes the error correction on the read data acquired by the processing of S309 (S310). In S310, the controller 200 executes the error correction by the ECC circuit 206, for example.

The controller 200 determines whether or not the error correction has been successful (S311). In response to determining that the error correction has been successful (S311: Yes), the controller 200 calculates a new reference read voltage on the basis of the temperature acquired by the processing of S302, the optimum read voltage acquired by the processing of S309, and the temperature correction information 210 (S312). Then, the controller 200 overwrites and records the new reference read voltage in the reference read voltage table 211 (S313).

In response to determining that the error correction has failed (S311: No), the controller 200 executes second error correction having a higher correction capability than the error correction executed in S306 or the error correction executed in S310 (S314). As the second error correction, any method can be adopted as long as the correction capability is high and the read data can be restored with a very high probability. For example, the controller 200 may execute error correction using soft decision as the second error correction. In another example, the controller 200 may perform error correction by combining product codes.

In response to determining that the error correction is successful (S307: Yes), after S313 or after the read data is restored in S314, the controller 200 outputs the read data to the host device 300 (S315). Then, the operation of the memory system 1 responding to the read command ends.

As described above, in a case where the error correction executed in the read operation responding to the read command from the host device 300 is failed, the optimum value acquisition operation (in this example, the first optimum value acquisition operation) is started. Then, the reference read voltage recorded in the reference read voltage table 211 is updated on the basis of the optimum read voltage acquired by the optimum value acquisition operation.

Note that the controller 200 can execute a transcription operation of transcribing data between blocks as one of the management of the NAND flash memory 100. The transcription operation includes, for example, garbage collection. The transcription operation includes a read operation of reading data from the NAND flash memory 100 and a write operation of writing data to the NAND flash memory 100. The controller 200 may be configured to execute the operations of S302 to S314 even in the read operation as a part of the transcription operation.

Moreover, a trigger of the optimum value acquisition operation and the update of the reference read voltage table 211 is not limited to the failure of the error correction at the time of the read operation corresponding to the write operation from the host device 300 or at the time of the read operation as part of the transcription operation.

For example, the controller 200 can execute patrol read as another management of the NAND flash memory 100. The patrol read is a read operation performed on the memory chip CP regardless of a request from the host device 300. The patrol read is a read operation on the purpose of specifying an optimum read voltage in advance in order to increase the probability of success in the error correction at the time of a read request from the host device 300. The controller 200 executes the patrol read at a predetermined cycle, for example. In response to a write command or a read command received from the host device 300, the controller 200 may skip execution of the patrol read or temporarily or non-temporarily change the execution cycle of the patrol read. That is, the patrol read is executed multiple times at different timings regardless of the read command from the host device 300.

In the embodiment, the controller 200 can perform the optimum value acquisition operation and update the reference read voltage table 211 at the time of the patrol read.

Figure 20:
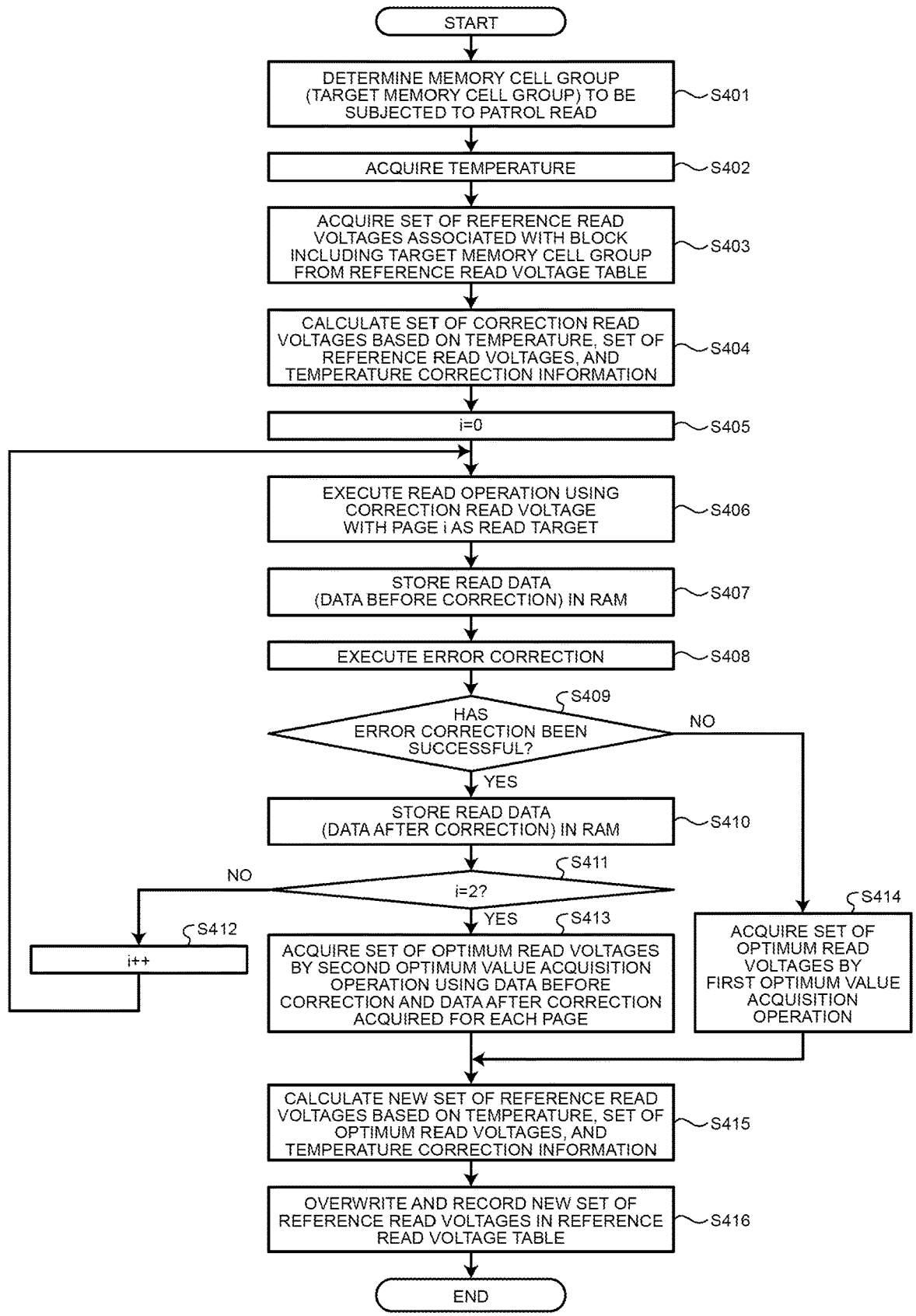
FIG. 20 is a flowchart illustrating an example of an operation of patrol read of the memory system according to the embodiment.

FIG. 20 is a flowchart illustrating an example of an operation of the patrol read of the memory system 1 of the embodiment. Here, as an example, the operation of the patrol read related to one block will be described.

The controller 200 determines the memory cell group MSG to be subjected to the patrol read by some method (S401). In the description of FIG. 20, the memory cell group MSG to be subjected to the patrol read is referred to as a target memory cell group MSG.

The controller 200 acquires a temperature used for reference to the temperature correction information 210 (S402). The temperature is, for example, a temperature detection value by the temperature sensor 112 or a temperature detection value by the temperature sensor 207.

The controller 200 acquires a set of reference read voltages associated with a block including the target memory cell group MSG from the reference read voltage table 211 (S403). Then, the controller 200 calculates a set of correction read voltages on the basis of the temperature acquired in the processing of S402, the set of reference read voltages acquired in the processing of S403, and the temperature correction information 210 (S404).

The controller 200 sequentially executes the read operation on each page constituting the target memory cell group MSG. In FIG. 20, each of the three pages included in the memory cell group MSG is referred to as Page i using an identifier i (where i is an integer of 0 to 2 inclusive). In one example, Page 0 represents a lower page, Page 1 represents a middle page, and Page 2 represents an upper page. Note that the correspondence between the identifier i and the three pages is not limited thereto.

The controller 200 initializes the identifier i to 0 (S405). Then, the controller 200 executes the read operation using the correction read voltage with Page i out of the three pages constituting the target memory cell group MSG as a read target (S406).

The controller 200 stores the read data acquired by the read operation in the RAM 202 as data before correction (S407), and executes error correction on the read data separately from the stored data before correction (S408). In S408, the controller 200 executes the error correction by the ECC circuit 206, for example.

The controller 200 determines whether or not the error correction has been successful (S409). In response to determining that the error correction has been successful (S409: Yes), the controller 200 stores the read data after the error correction in the RAM 202 as data after correction (S410). Then, the controller 200 determines whether or not the identifier i is equal to 2 (S411).

In response to determining that the identifier i is not equal to 2 (S411: No), namely, the identifier i is 0 or 1, the controller 200 increments i by 1 (S412). Then, the controller 200 repeats a series of processing from the processing of S406 again.

In response to determining that the identifier i is equal to 2 (S411: Yes), the controller 200 acquires a set of optimum read voltages by the second optimum value acquisition operation using the data before correction and the data after correction acquired for each page (S413).

In response to determining that the error correction has failed when executing the read operation on any page (S409: No), the second optimum value acquisition operation cannot be executed. Therefore, the controller 200 acquires a set of optimum read voltages by the first optimum value acquisition operation (S414).

After S413 or S414, the controller 200 calculates a new set of reference read voltages on the basis of the temperature acquired by the processing of S402, the set of optimal read voltages acquired by the processing of S413 or S414, and the temperature correction information 210 (S415). Then, the controller 200 overwrites and records the new set of reference read voltages in the reference read voltage table 211 (S416). Then, the operation of the patrol read related to one block ends.

Figure 21:
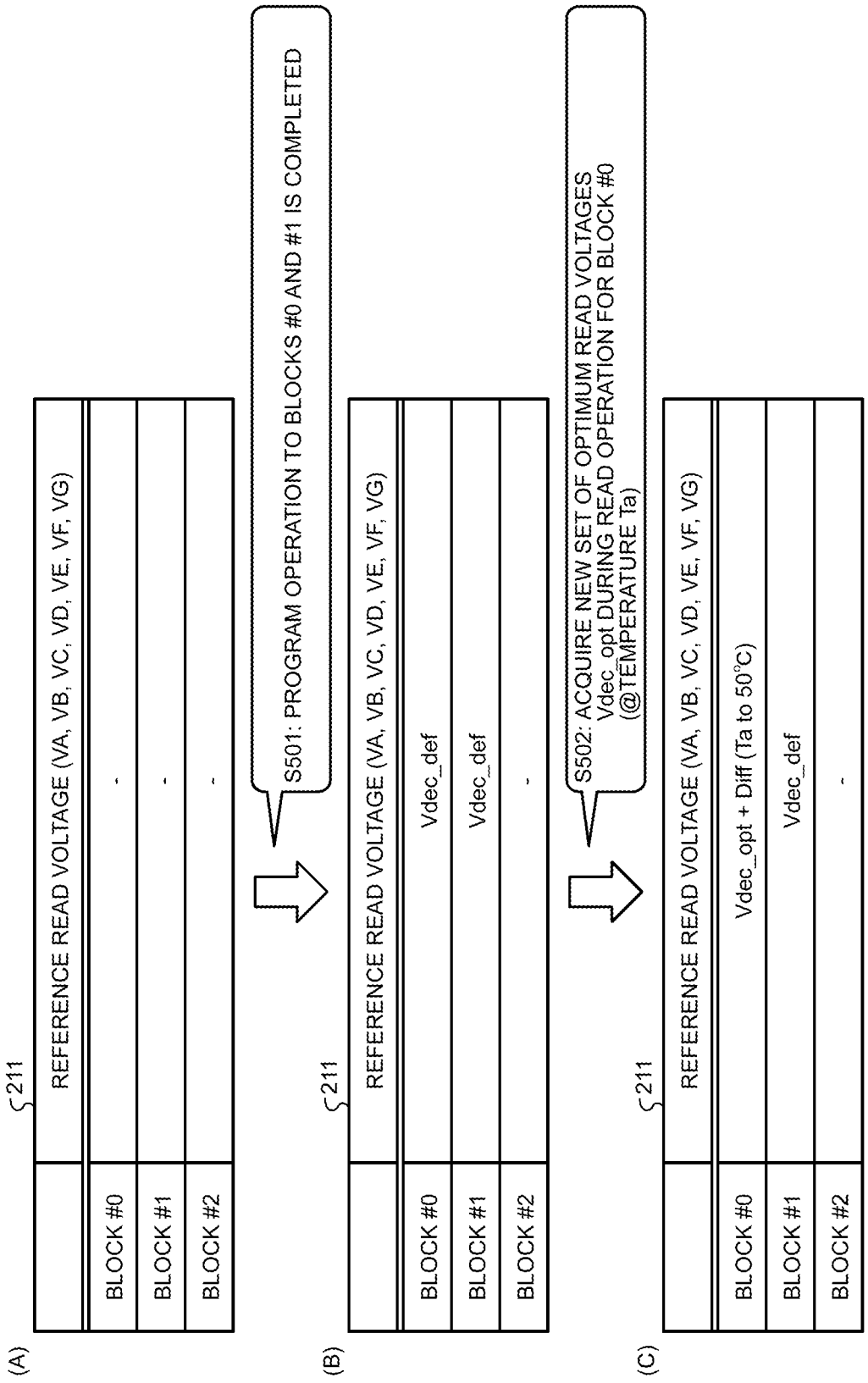
FIG. 21 is a diagram illustrating an example of a change in contents of a reference read voltage table according to the embodiment.

FIG. 21 is a diagram illustrating an example of a change in the contents of the reference read voltage table 211 according to the embodiment.

Part (A) of FIG. 21 illustrates the reference read voltage table 211 in an initial state. In the initial state, the set of reference read voltages for each block is undefined.

For example, when the program operation to the block #0 and the block #1 is completed (S501), the contents of the reference read voltage table 211 change to the state illustrated in Part (B). In the reference read voltage table 211 illustrated in Part (B), a set Vdec_def of initial setting values of the read voltages is recorded as a set of reference read voltages related to the block #0 and the block #1.

Subsequently, for example, a read operation on the block #0 is executed in response to a read command from the host device 300. It is assumed that a temperature at the time of executing the read operation is Ta. In the read operation, a new set of optimum read voltages Vdec_opt is acquired (S502), and the contents of the reference read voltage table 211 change to the state illustrated in Part (C). According to the reference read voltage table 211 illustrated in Part (C), in the block #0, a set of values obtained by adding the set of the optimum read voltages Vdec_opt and the correction amount Diff (Ta to 50° C.) corresponding to the temperature Ta is recorded as a set of the reference read voltages of the block #0.

The controller 200 of the embodiment has the above-described configuration. Therefore, for example, in a case where the read operation is executed at a certain timing (denoted as a first timing) for a certain block and the error correction fails (for example, refer to S307 in FIG. 19), or the patrol read is executed at the first timing (for example, refer to FIG. 20), and the next read operation (refer to FIG. 19) is executed at a first subsequent timing (denoted as a second timing), the controller 200 operates as follows. That is, at the first timing, the controller 200 acquires a temperature detection value (referred to as a first temperature detection value) from the temperature sensor 112 or the temperature sensor 207, and acquires the optimum read voltage by the first optimum value acquisition operation or the second optimum value acquisition operation. Then, the controller 200 converts the optimum read voltage into a reference read voltage on the basis of the first temperature detection value and the temperature correction information 210, and records the reference read voltage in the reference read voltage table 211. Then, at the second timing, the controller 200 newly acquires a temperature detection value (referred to as a second temperature detection value) from the temperature sensor 112 or the temperature sensor 207, converts the reference read voltage recorded in the reference read voltage table 211 into a correction read voltage that is a read voltage at the temperature of the second temperature detection value on the basis of the second temperature detection value and the temperature correction information 210, and executes the read operation using the correction read voltage as the read voltage.

As described above, the optimum read voltage is managed by being converted into the voltage value at the temperature set value on the basis of the temperature correction information 210. Therefore, it is possible to suppress the number of error bits occurring in the read data without complicating the management for changing the read voltage in accordance with the temperature. That is, it is possible to suppress the number of error bits occurring in the read data with simple management.

Note that the technique of the embodiment can be variously modified. Some modifications of the technique of the embodiment will be described below. In the description of the modifications, matters different from the technique of the embodiment described above will be described. The same matters as those of the technique of the embodiment will not be described or will be briefly described.

First Modification

Figure 22:
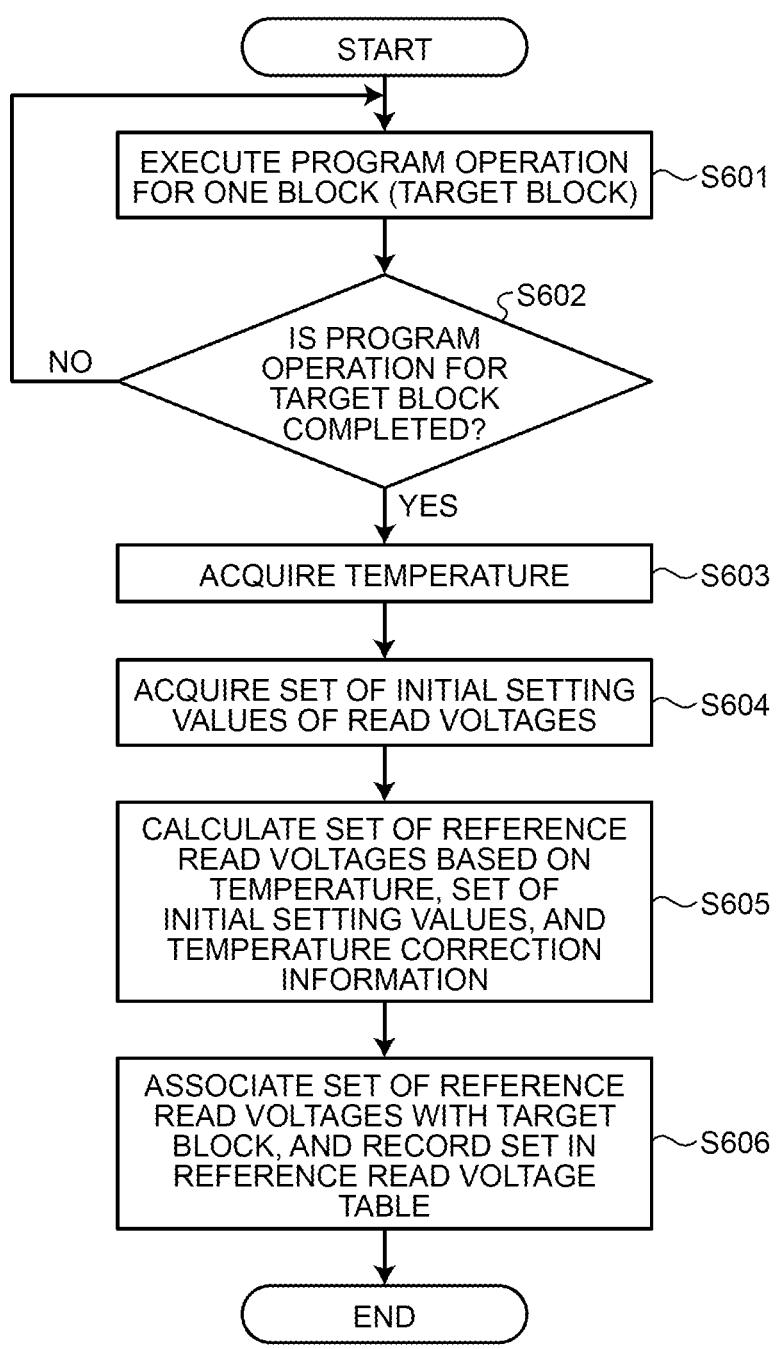
FIG. 22 is a flowchart illustrating an example of an operation of a memory system of a first modification in the program operation.

FIG. 22 is a flowchart illustrating an example of an operation of a memory system 1 of a first modification at the time of the program operation.

In the first modification, the controller 200 executes the same processing as S201 to S202 illustrated in FIG. 18 in S601 to S602.

In response to determining that the program operation on the target block is completed (S602: Yes), the controller 200 acquires the temperature (S603). The temperature is, for example, a temperature detection value by the temperature sensor 112 or a temperature detection value by the temperature sensor 207.

Subsequently, the controller 200 acquires a set of initial setting values of the read voltages (S604). Then, the controller 200 calculates a reference read voltage on the basis of the temperature acquired by the processing of S603, the set of initial setting values of the read voltages acquired by the processing of S604, and the temperature correction information 210 (S605). Specifically, the controller 200 acquires the correction amount corresponding to the temperature on the basis of the temperature correction information 210. Then, the controller 200 acquires the reference read voltage by adding the correction amount to the initial setting value of each read voltage.

The controller 200 records, in the reference read voltage table 211, the set of reference read voltages acquired in the processing of S605 in association with the target block (S606), and the operation ends.

Figure 23:
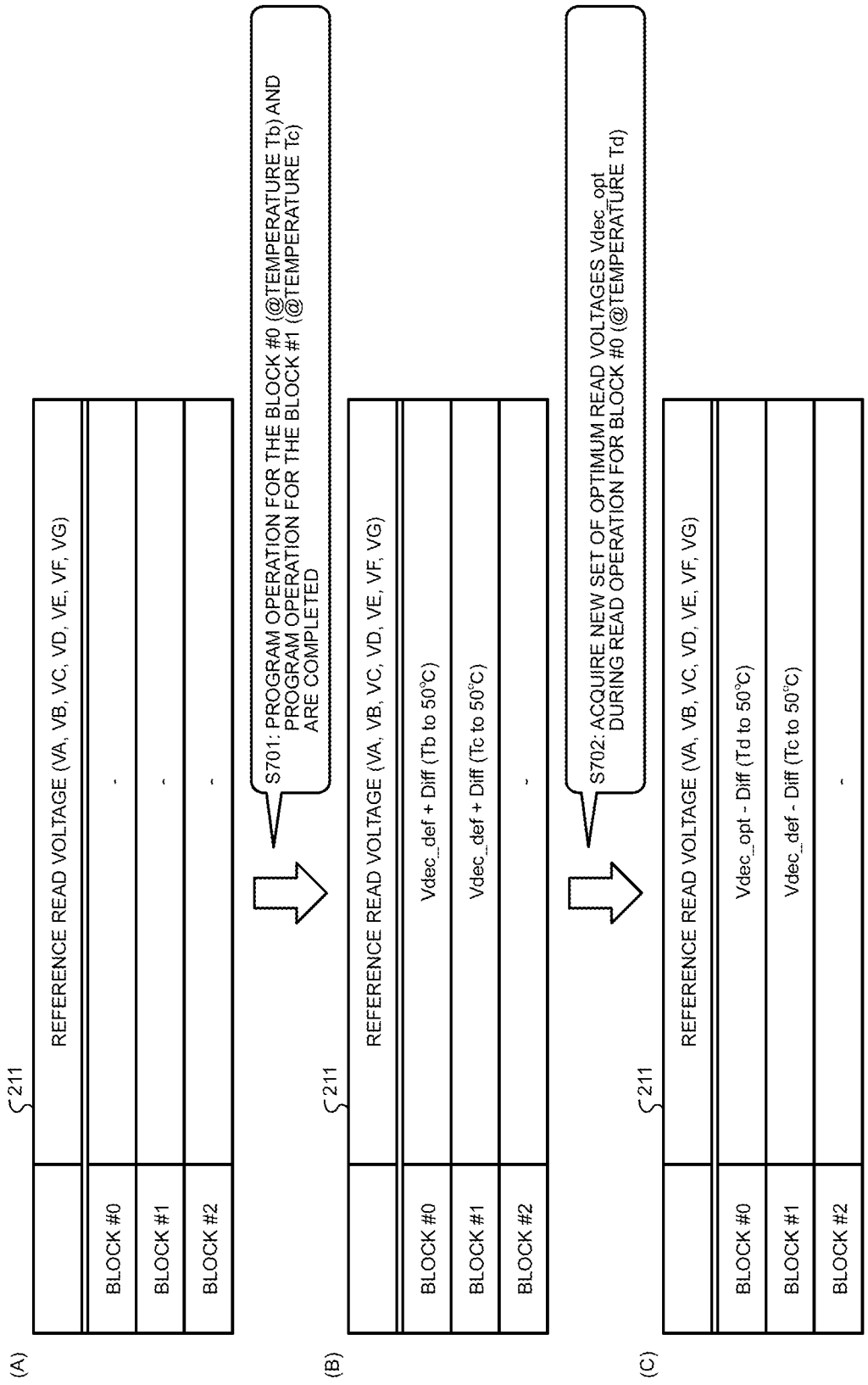
FIG. 23 is a diagram illustrating an example of a change in contents of a reference read voltage table of the first modification.

FIG. 23 is a diagram illustrating an example of a change in the contents of the reference read voltage table 211 of the first modification.

Part (A) of FIG. 23 illustrates the reference read voltage table 211 in an initial state. In the initial state, the set of reference read voltages for each block is undefined.

For example, when the program operations to the block #0 and the block #1 is completed (S701), the contents of the reference read voltage table 211 change to the state illustrated in Part (B). Note that a temperature at the time of the program operation to the block #0 is Tb, and a temperature at the time of the program operation to the block #1 is Tc. In the reference read voltage table 211 illustrated in Part (B), a set of values obtained by adding a set Vdec_def of initial setting values of the read voltages and the correction amount Diff (Tb to 50° C.) corresponding to the temperature Tb is recorded as a set of reference read voltages of the block #0. Moreover, a set of values obtained by adding the set Vdec_def of the initial setting values of the read voltages and the correction amount Diff (Tc to 50° C.) corresponding to the temperature Tc is recorded as the set of the reference read voltages of the block #1.

Subsequently, for example, a read operation on the block #0 is executed in response to a read command from the host device 300. It is assumed that the temperature at the time of executing the read operation is Td. In the read operation, a new set of optimum read voltages Vdec_opt is acquired (S702), and the contents of the reference read voltage table 211 change to the state illustrated in Part (C). According to the reference read voltage table 211 illustrated in Part (C), a set of values obtained by adding the set Vdec_opt of the optimum read voltage and the correction amount Diff (Td to 50° C.) corresponding to the temperature Td is recorded as the set of the reference read voltages of the block #0.

As described above, in the first modification, the controller 200 is configured to execute conversion based on the temperature correction information 210 also when recording the reference read voltage in the program operation.

That is, according to the first modification, in a case where the program operation is executed for a certain block, and then the read operation is executed on the block in response to the read command from the host device 300 or as a part of the transcription operation, the controller 200 operates as follows. That is, in the program operation, the controller 200 calculates a set of reference read voltages by performing conversion based on the temperature at the time of the program operation and the temperature correction information 210 on the set of initial setting values of the read voltages, and records the set of reference read voltages in the reference read voltage table 211. In the subsequent read operation, the controller 200 acquires the correction read voltage by converting the reference read voltage recorded in the reference read voltage table 211 on the basis of the temperature and the temperature correction information 210 at the time of the read operation. The controller 200 then executes the read operation using the correction read voltage.

Second Modification

In a second modification, a set of candidate values of the read voltages is prepared in advance. An index is associated with the set of candidate values for the read voltages, and the controller 200 stores an index corresponding to the set of candidate values close to the set of immediate values, rather than storing the set of reference read voltages as the set of immediate values. The set of candidate values of the read voltages is referred to as a shift pattern. The shift pattern is recorded in advance in a shift index table 212.

Figure 24:
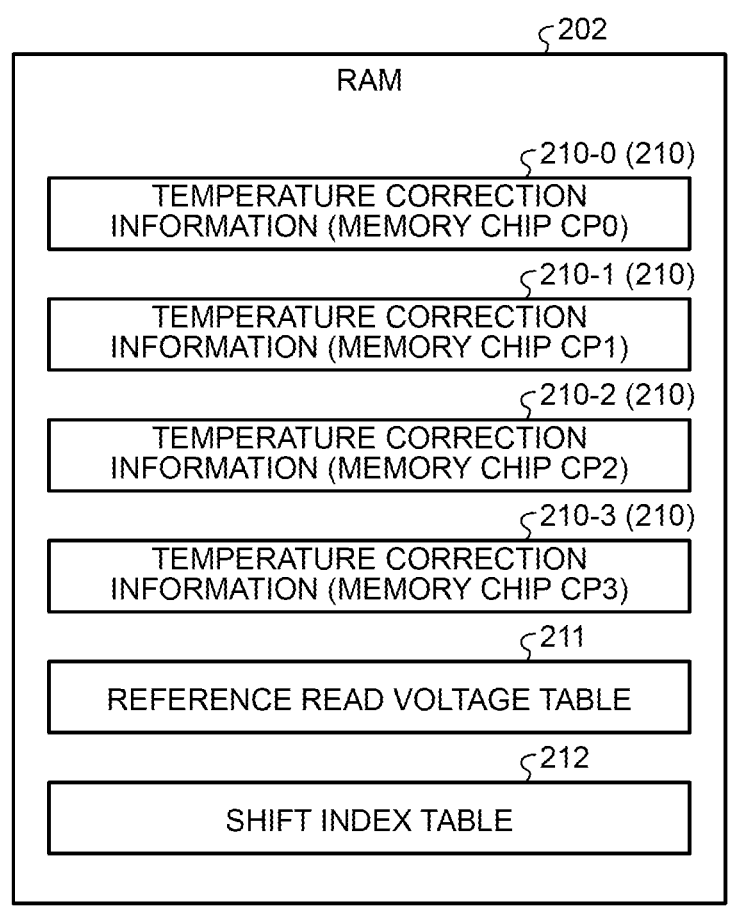
FIG. 24 is a diagram illustrating an example of information held in a RAM in an operation of a memory system of a second modification.

FIG. 24 is a diagram illustrating an example of information held in the RAM 202 in the operation of the memory system 1 of the second modification. As illustrated in the drawing, in the operation, the RAM 202 holds temperature correction information 210-0 acquired from the memory chip CP0, temperature correction information 210-1 acquired from the memory chip CP1, temperature correction information 210-2 acquired from the memory chip CP2, temperature correction information 210-3 acquired from the memory chip CP3, a reference read voltage table 211, and the shift index table 212.

Note that the temperature correction information 210 is an example of first information. The reference read voltage table 211 is an example of second information. The shift index table 212 is an example of third information. The RAM 202 is an example of a second memory configured to store the first information, an example of a third memory configured to store the second information, and an example of a fourth memory configured to store the third information. The second memory, the third memory, and the fourth memory may be configured by one RAM 202 as in the second modification, or may be configured by different memories.

FIG. 25 is a diagram illustrating an example of a data structure of the shift index table 212 according to the second modification.

The shift index table 212 includes a plurality of entries, and one shift pattern is recorded in each entry. The shift pattern is a set including one value of each of all types of read voltages, and indicates a candidate value of the read voltage.

Each entry included in the shift index table 212 is distinguished by an index. Then, a shift pattern is recorded in each entry. The shift pattern recorded in each entry is a candidate value of the read voltage. That is, the shift pattern is associated with an index value.

Figure 26:
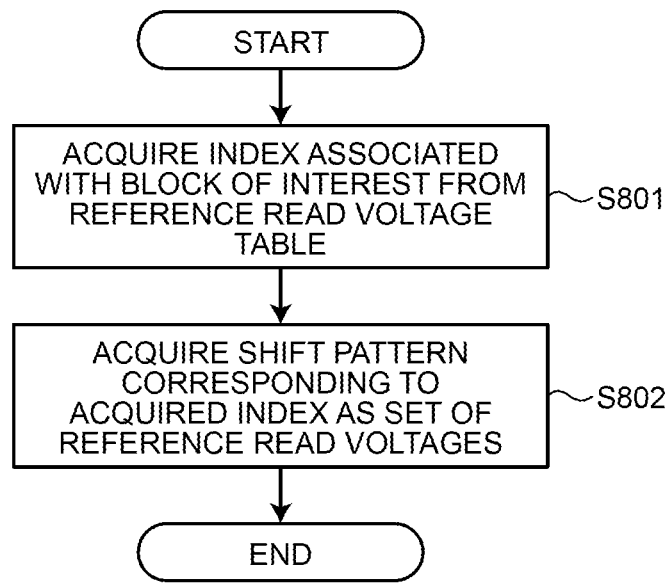
FIG. 26 is a flowchart illustrating an example of a method of acquiring a set of reference read voltages using a reference read voltage table and the shift index table according to the second modification.

FIG. 26 is a flowchart illustrating an example of a method of acquiring a set of reference read voltages by using the reference read voltage table 211 and the shift index table 212 in the second modification. A series of operations illustrated in FIG. 26 is executed in S303 of FIGS. 19 and S403 of FIG. 20.

In the reference read voltage table 211, an index is recorded instead of a set of immediate values of the reference read voltages. Therefore, the controller 200 acquires an index associated with the block of interest from the reference read voltage table 211 (S801). Then, the controller 200 refers to the shift index table 212 to acquire the shift pattern corresponding to the index acquired by the processing of S801 as a set of reference read voltages (S802). Then, the operation of acquiring the set of reference read voltages using the reference read voltage table 211 and the shift index table 212 ends.

Figure 27:
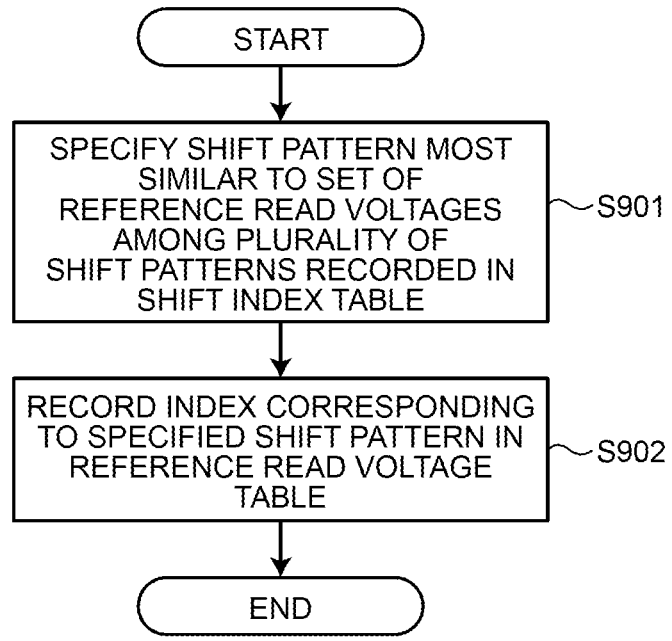
FIG. 27 is a flowchart illustrating an example of a method of recording the set of reference read voltages according to the second modification.

FIG. 27 is a flowchart illustrating an example of a method of recording a set of reference read voltages according to the second modification. A series of operations illustrated in FIG. 27 is executed in S313 in FIG. 19, S416 in FIG. 20, and S606 in FIG. 22.

The controller 200 specifies a shift pattern most similar to a set of reference read voltages out of a plurality of shift patterns recorded in the shift index table 212 (S901). An optional index can be used as an index of the similarity between the set of reference read voltages and the shift pattern. For example, Euclidean distance, cosine similarity, etc. may be used as the indicator of the similarity.

Note that in a case where the series of operations illustrated in FIG. 27 is executed in S313 of FIG. 19, the controller 200 acquires a new set of reference read voltages by updating an old set of reference read voltages, that is, a set of reference read voltages acquired in the processing of S802 of the series of operations in FIG. 26 instead of the processing of S303 of FIG. 19 with a new reference read voltage acquired in the processing of S312 of FIG. 19. Then, the controller 200 executes the processing of S901 on the new set of reference read voltages.

After S901, the controller 200 records the index corresponding to the specified shift pattern in the reference read voltage table 211 (S902). Then, the operation of recording the set of reference read voltages ends.

As described above, the reference read voltage table 211 may be configured such that an index corresponding to one shift pattern selected from the plurality of shift patterns is recorded as a set of reference read voltages.

Note that the second modification described above can be applied not only to the embodiment but also to the first modification.

Third Modification

In the embodiment, the first modification, and the second modification, the initial setting value is basically fixed. The initial setting value may be configured to be variable.

As described above, a rate of change in the threshold voltage of the memory cell is the fastest immediately after the completion of the program operation, and decreases with the elapsed time. Moreover, in a relatively short period immediately after the completion of the program operation, since the number of accesses received after the completion of the program operation is not large, it is considered that the threshold voltage changes in a similar change pattern in a plurality of storage areas having similar characteristics. Moreover, there is a possibility that the reference read voltage corresponding to the block in which the elapsed time from the completion of the program operation is relatively short is not updated by the patrol read. In a case where a series of operations related to the read operation illustrated in FIG. 19 is executed on the basis of the reference read voltage that has not been updated by the patrol read, there is a considerable possibility that error correction for the read data fails.

In the third modification, the initial setting value is updated by a predetermined operation in order to suppress the probability that error correction fails at the time of the read operation on the block in which the elapsed time from the completion of the program operation is relatively short. One set of initial setting values is commonly used in a group of blocks that are considered to have similar threshold voltage change characteristics. The rule of grouping the blocks can be optionally determined by the manufacturer. For example, one group is formed for each memory chip CP. Alternatively, one group is formed in units of planes. Alternatively, the memory cell array 111 is divided into a plurality of sub regions in accordance with a distance from the sense amplifier, and one group is formed in units of sub regions.

FIG. 28 is a diagram illustrating an example of a management method of the third modification of the set of the initial setting values.

The initial setting values are recorded in an initial setting value table 213. Specifically, the initial setting value table 213 includes an entry for each block group, and a set of initial setting values is recorded in each entry.

For example, in the processing of S203 of FIG. 18 and the processing of S204 of FIG. 22, the controller 200 acquires the set of initial setting values related to the block group to which the block for which the program operation is completed belongs from the initial setting value table 213.

The initial setting value table 213 is stored in, for example, the RAM 202, and updating of the initial setting value table 213 is executed on the RAM 202.

FIG. 29 is a flowchart illustrating an example of an update method of the third modification of the set of initial setting values.

In the third modification, a representative block is set for each block group. A method of setting the representative block is not limited to a specific method.

When the program operation on the representative block is completed (S1001) and a predetermined short time (for example, 6 hours) elapses after the program operation on the representative block is completed (S1002), the controller 200 acquires a set of reference read voltages related to the representative block by performing various processing including the optimum value acquisition operation (S1003). In one example, the controller 200 selects the memory cell group MSG from the representative block by some method and executes the processing of S402 to S415 of FIG. 20 on the memory cell group MSG to acquire a set of reference read voltages related to the representative block.

The controller 200 overwrites and records the obtained set of reference read voltages in the initial setting value table 213 as a set of initial setting values related to the block group to which the representative block belongs (S1004). Then, the operation of updating the set of initial setting values ends.

As described above, according to the third modification, the controller 200 updates the set of initial setting values related to the block group on the basis of the optimum value acquisition operation on the representative block selected from the block group.

Therefore, it is possible to suppress the probability that the error correction fails at the time of the read operation on the block in which the elapsed time from the completion of the program operation is relatively short.

Note that the above-described third modification can be applied not only to the embodiment but also to the first modification, the second modification, or both of them.

While some embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
    a non-volatile first memory including a first storage area, the first storage area including a word line and a plurality of memory cells connected to the word line;
    a second memory configured to store first information corresponding to temperature dependency of threshold voltages of the plurality of memory cells;
    a third memory configured to store second information in which voltage values corresponding to threshold voltages of the plurality of memory cells are recorded;
    a temperature sensor; and
    a controller configured to, at a first timing,
acquire a first temperature detection value from the temperature sensor,
execute an acquisition operation on the first storage area, the acquisition operation being an operation of determining, by using the threshold voltages, whether the plurality of memory cells are in an on state or an off state and acquiring, on the basis of a determination result, a first voltage value being a value of the voltage values for suppressing an occurrence number of error bits, and
convert, on the basis of the first temperature detection value and the first information, the first voltage value into a second voltage value of the voltage values at a first temperature, and record the second voltage value in the second information, and,
at a second timing after the first timing,
acquire, from the temperature sensor, a second temperature detection value indicating a second temperature,
convert the second voltage value recorded in the second information into a third voltage value of the voltage values at the second temperature, the second voltage value being converted on the basis of the second temperature detection value and the first information, and
execute a first read operation of acquiring data from the plurality of memory cells by using a read voltage indicated by the third voltage value.

2. The memory system according to claim 1, wherein the controller is configured to:
execute a second read operation of acquiring data from the plurality of memory cells; and
execute error correction on the data acquired by the second read operation, and
the first timing is a timing at which the error correction is failed.

3. The memory system according to claim 1, wherein the acquisition operation is an operation of acquiring the first voltage value on the basis of a group of determination results, the group of determination results being obtained by determining, multiple times, whether the plurality of memory cells are in an on state or an off state while varying a value of the voltage values.

4. The memory system according to claim 2, wherein the acquisition operation is an operation of acquiring the first voltage value on the basis of a group of determination results, the group of determination results being obtained by determining, multiple times, whether the plurality of memory cells are in an on state or an off state while varying a value of the voltage values.

5. The memory system according to claim 1, wherein the controller is configured to, at the first timing,
execute a second read operation of acquiring data from the plurality of memory cells,
execute error correction on the data acquired by the second read operation, and
execute a first acquisition operation when the error correction is failed, and
the first acquisition operation is an operation of acquiring the first voltage value on the basis of a group of determination results, the group of determination results being obtained by determining, multiple times, whether the plurality of memory cells are in an on state or an off state while varying a value of the voltage values.

6. The memory system according to claim 1, wherein the controller is configured to, at the first timing,
execute a second read operation of acquiring data from the plurality of memory cells,
execute error correction on the data acquired by the second read operation, and
execute a second acquisition operation when the error correction is successful, and
the second acquisition operation is an operation of calculating the first voltage value on the basis of a comparison between the data before the error correction and the data after the error correction.

7. The memory system according to claim 2, wherein the controller is configured to,
at a third timing before the first timing,
execute a program operation of setting threshold voltages of the plurality of memory cells to values corresponding to data,
acquire a third temperature detection value from the temperature sensor, and
convert, on the basis of the third temperature detection value and the first information, a fourth voltage value which is an initial setting value of the voltage values, into a fifth voltage value of the voltage values at a third temperature, and record the fifth voltage value in the second information, and
in the second read operation,
acquire, from the temperature sensor, a fourth temperature detection value indicating a fourth temperature,
acquire the fifth voltage value from the second information,
convert, on the basis of the fourth temperature detection value and the first information, the acquired fifth voltage value into a sixth voltage value of the voltage values at the fourth temperature, and
use a read voltage indicated by the sixth voltage value.

8. The memory system according to claim 7, wherein the first memory includes a plurality of second storage areas including the first storage area,
each of the plurality of second storage areas includes a word line and a plurality of memory cells connected to the word line, and
the controller is configured to
execute the acquisition operation on a third storage area selected from the plurality of second storage areas, and
update the initial setting value on the basis of the acquisition operation on the third storage area.

9. The memory system according to claim 1, further comprising a fourth memory configured to store third information in which a plurality of candidate values is recorded, each of the plurality of candidate values being associated with a respective index,
wherein, in the second information, an index corresponding to a value selected from the plurality of candidate values is recorded as a value of the voltage values.

10. A method of controlling a non-volatile memory, the non-volatile memory including a first storage area, the first storage area including a word line and a plurality of memory cells connected to the word line, the method comprising:
managing first information corresponding to temperature dependency of threshold voltages of the plurality of memory cells;
managing second information in which voltage values corresponding to threshold voltages of the plurality of memory cells are recorded;

performing, at a first timing, processing including
acquiring a first temperature detection value from a temperature sensor,
executing an acquisition operation on the first storage area, the acquisition operation being an operation of determining, by using the threshold voltages, whether the plurality of memory cells are in an on state or an off state and acquiring, on the basis of a determination result, a first voltage value being a value of the voltage values for suppressing an occurrence number of error bits, and
converting, on the basis of the first temperature detection value and the first information, the first voltage value into a second voltage value of the voltage values at a first temperature, and recording the second voltage value in the second information; and
performing, at a second timing after the first timing, processing including
acquiring, from the temperature sensor, a second temperature detection value indicating a second temperature,
converting, on the basis of the second temperature detection value and the first information, the second voltage value recorded in the second information into a third voltage value a value of the voltage values at the second temperature, the second voltage value being converted, and
executing a first read operation of acquiring data from the plurality of memory cells by using a read voltage indicated by the third voltage value.

11. The method according to claim 10, further comprising:
executing a second read operation of acquiring data from the plurality of memory cells; and
executing error correction on the data acquired by the second read operation,
wherein the first timing is a timing at which the error correction is failed.

12. The method according to claim 10, wherein the acquisition operation is an operation of acquiring the first voltage value on the basis of a group of determination results, the group of determination results being obtained by determining, multiple times, whether the plurality of memory cells are in an on state or an off state while varying a value of the voltage values.

13. The method according to claim 11, wherein the acquisition operation is an operation of acquiring the first voltage value on the basis of a group of determination results, the group of determination results being obtained by determining, multiple times, whether the plurality of memory cells are in an on state or an off state while varying a value of the voltage values.

14. The method according to claim 10, further comprising: at the first timing,
executing a second read operation of acquiring data from the plurality of memory cells;
executing error correction on the data acquired by the second read operation; and
executing a first acquisition operation when the error correction is failed,
wherein the first acquisition operation is an operation of acquiring the first voltage value on the basis of a group of determination results, the group of determination results being obtained by determining, multiple times, whether the plurality of memory cells are in an on state or an off state while varying a value of the voltage values.

15. The method according to claim 10, further comprising: at the first timing,
executing a second read operation of acquiring data from the plurality of memory cells;
executing error correction on the data acquired by the second read operation; and
executing a second acquisition operation when the error correction is successful,
wherein the second acquisition operation is an operation of calculating the first voltage value on the basis of a comparison between the data before the error correction and the data after the error correction.

16. The method according to claim 11, further comprising:
performing, at a third timing before the first timing, processing including
executing a program operation of setting threshold voltages of the plurality of memory cells to values corresponding to data,
acquiring a third temperature detection value from the temperature sensor, and
converting, on the basis of the third temperature detection value and the first information, a fourth voltage value which is an initial setting value of the voltage values, into a fifth voltage value of the voltage values at a third temperature, and recording the fifth voltage value in the second information; and
performing, in the second read operation, processing including
acquiring a fourth temperature detection value from the temperature sensor,
acquiring the fifth voltage value from the second information,
converting the acquired fifth voltage value into a sixth voltage value being a value of the voltage values in the fourth temperature detection value on the basis of the fourth temperature detection value and the first information, and
using a read voltage indicated by the sixth voltage value.

17. The method according to claim 16, wherein
the non-volatile memory includes a plurality of second storage areas including the first storage area,
each of the plurality of second storage areas includes a word line and a plurality of memory cells connected to the word line, and
the method further comprises:
executing the acquisition operation on a third storage area selected from the plurality of second storage areas; and
updating the initial setting value on the basis of the acquisition operation on the third storage area.

18. The method according to claim 10, further comprising storing, in a fourth memory, third information in which a plurality of candidate values is recorded, each of the plurality of candidate values being associated with a respective index,
wherein, in the second information, an index corresponding to a value selected from the plurality of candidate values is recorded as a value of the voltage values.

* * * * *